United States Patent
Fairy et al.

(10) Patent No.: US 11,065,791 B2
(45) Date of Patent: Jul. 20, 2021

(54) HOT RUNNER NOZZLE TIP AND HOT RUNNER NOZZLE TIP COMPONENTS

(71) Applicant: MOLD-MASTERS (2007) LIMITED, Georgetown (CA)

(72) Inventors: Fabrice Fairy, Vaughan (CA); John Di Simone, Woodbridge (CA); Denis Babin, Georgetown (CA)

(73) Assignee: MOLD-MASTERS (2007) LIMITED, Georgetown (CA)

( * ) Notice: Subject to any disclaimer, the term of this patent is extended or adjusted under 35 U.S.C. 154(b) by 680 days.

(21) Appl. No.: 15/559,718

(22) PCT Filed: Mar. 21, 2016

(86) PCT No.: PCT/CA2016/050321
§ 371 (c)(1),
(2) Date: Sep. 19, 2017

(87) PCT Pub. No.: WO2016/149813
PCT Pub. Date: Sep. 29, 2016

(65) Prior Publication Data
US 2018/0099442 A1 Apr. 12, 2018

Related U.S. Application Data

(60) Provisional application No. 62/135,736, filed on Mar. 20, 2015, provisional application No. 62/267,779, filed on Dec. 15, 2015.

(51) Int. Cl.
*B29C 45/30* (2006.01)
*B29C 45/27* (2006.01)

(52) U.S. Cl.
CPC ............ *B29C 45/278* (2013.01); *B29C 45/30* (2013.01); *B29C 2045/2787* (2013.01)

(58) Field of Classification Search
CPC .......................... B29C 2045/302; B29C 45/30
See application file for complete search history.

(56) References Cited

U.S. PATENT DOCUMENTS 2,500,401 A 3/1950 Cossette
3,989,434 A 11/1976 Mercer
(Continued)

FOREIGN PATENT DOCUMENTS

CN 200960485 10/2007
CN 104097297 A 10/2014
(Continued)

OTHER PUBLICATIONS

DU CN200960485 Translation (Year: 2007).*
(Continued)

*Primary Examiner* — Jacob T Minskey
*Assistant Examiner* — Adrien J Bernard
(74) *Attorney, Agent, or Firm* — Medler Ferro Woodhouse & Mills PLLC

(57) ABSTRACT

A hot runner nozzle tip and hot runner nozzle tip components are disclosed, the nozzle tip, and the assembled tip components, form a channel that has a first annular segment that has a cross-sectional area that increases in size away from a tip inlet, and a second annular segment that extends from the first annular channel segment. A hot runner tip assembly is also disclosed. The hot runner tip assembly includes a tip component having an attachment portion, an extension portion that projects from the attachment portion, and a bore that extends therethrough. A sleeve having a rib that extends outward therefrom surrounds the extension portion. The sleeve contacts the tip component at a first contact area and at a second contact area so as to create a void therebetween, and the first and second contact areas are offset from the rib.

8 Claims, 11 Drawing Sheets

(56) References Cited

U.S. PATENT DOCUMENTS

| | | | |
|---|---|---|---|
| 4,266,723 A | 5/1981 | Osuna-Diaz | |
| 4,279,588 A | 7/1981 | Gellert | |
| 4,450,999 A | 5/1984 | Gellert | |
| 4,711,625 A * | 12/1987 | Knauer | B29C 45/30 |
| | | | 219/421 |
| 5,028,227 A * | 7/1991 | Gellert | B29C 45/2711 |
| | | | 264/328.15 |
| 5,284,436 A | 2/1994 | Gellert | |
| 5,405,258 A | 4/1995 | Babin | |
| 5,421,716 A | 6/1995 | Gellert | |
| 6,609,902 B1 | 8/2003 | Blais et al. | |
| 6,971,868 B2 | 12/2005 | Ciccone | |
| 7,326,048 B2 | 2/2008 | Saito et al. | |
| 7,344,372 B2 | 3/2008 | Fairy | |
| 7,604,476 B2 | 10/2009 | Mohammed | |
| 7,611,349 B2 | 11/2009 | Fairy | |
| 2003/0082266 A1 * | 5/2003 | Babin | B29C 45/2806 |
| | | | 425/562 |
| 2005/0175732 A1 * | 8/2005 | Saito | B29C 45/30 |
| | | | 425/569 |
| 2007/0003661 A1 | 1/2007 | Ciccone | |

FOREIGN PATENT DOCUMENTS

| | | |
|---|---|---|
| CN | 203863945 U | 10/2014 |
| DE | 7718446 U1 | 10/1977 |
| EP | 1 612 025 A1 | 5/2010 |
| JP | H07-223238 A | 8/1995 |

OTHER PUBLICATIONS

Extended Search Report dated Aug. 16, 2018 in corresponding European Patent Application No. 16 767 580.0.

International Search Report issued in PCT/CA2016/050321, dated May 4, 2016.

* cited by examiner

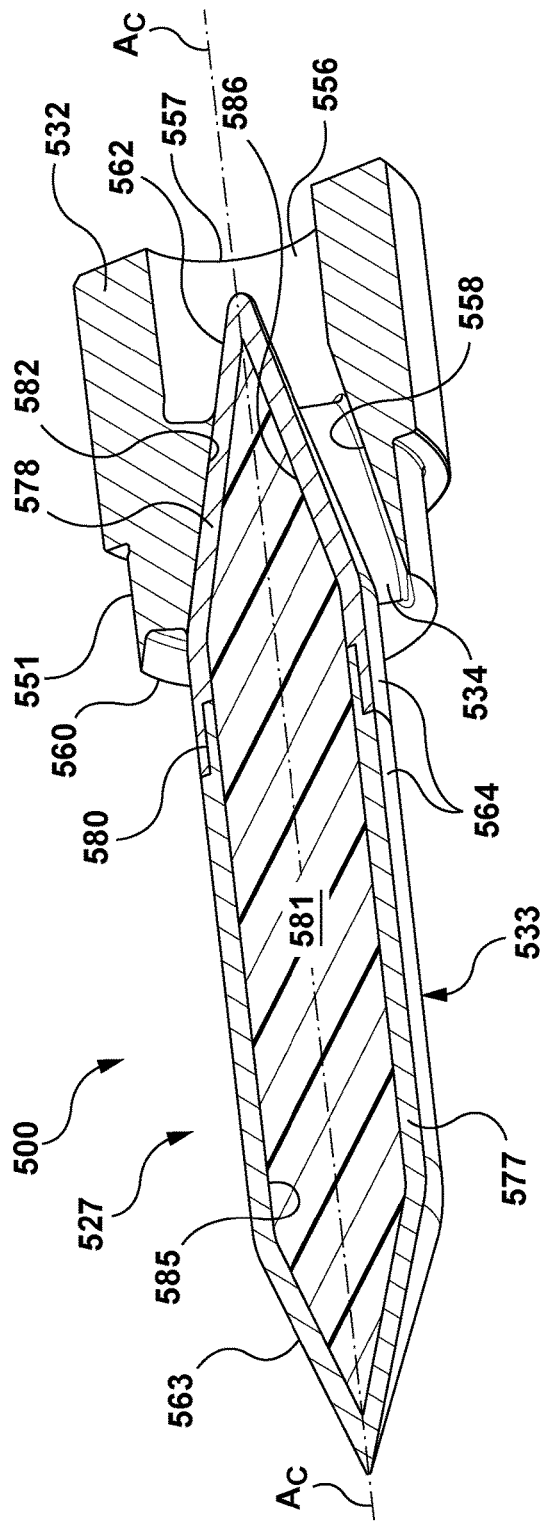
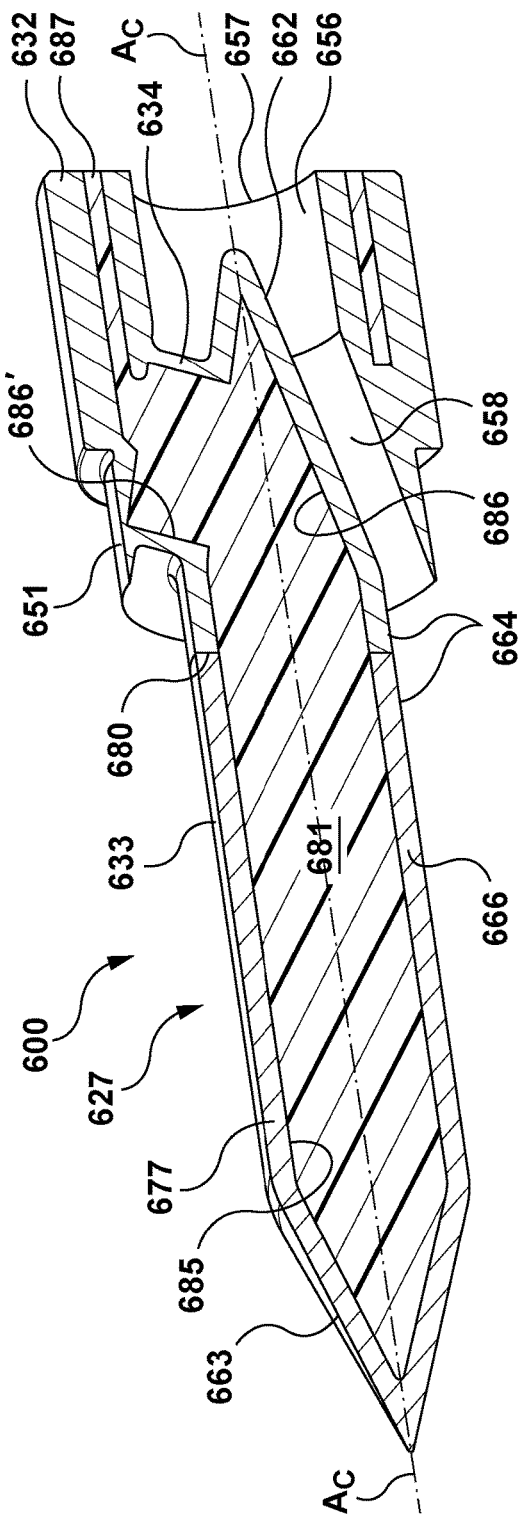
FIG. 5
FIG. 6

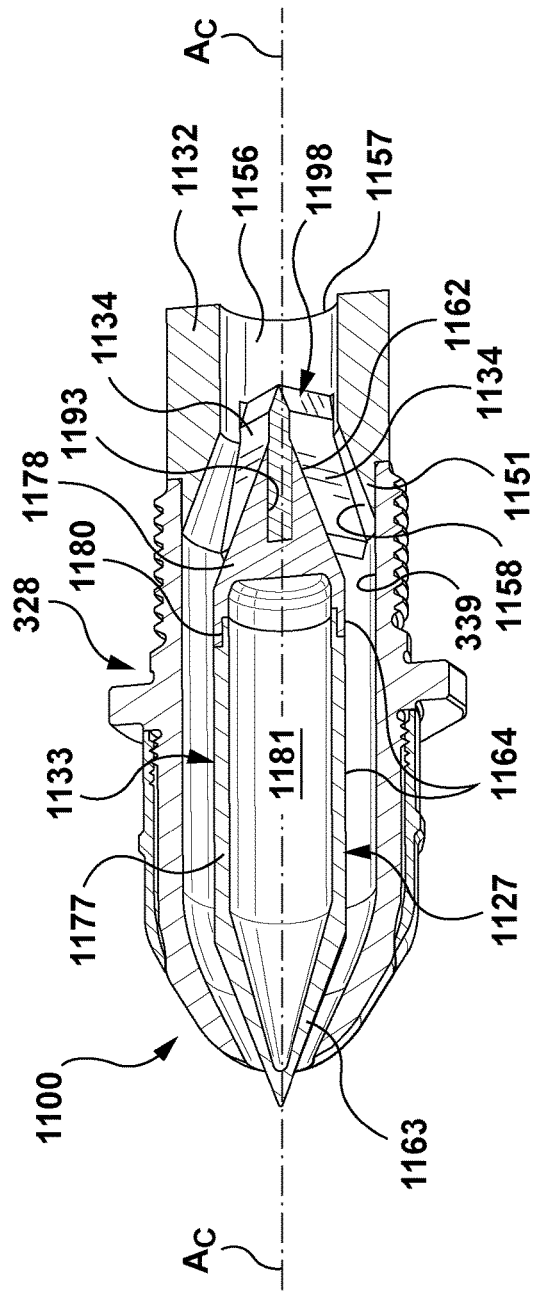
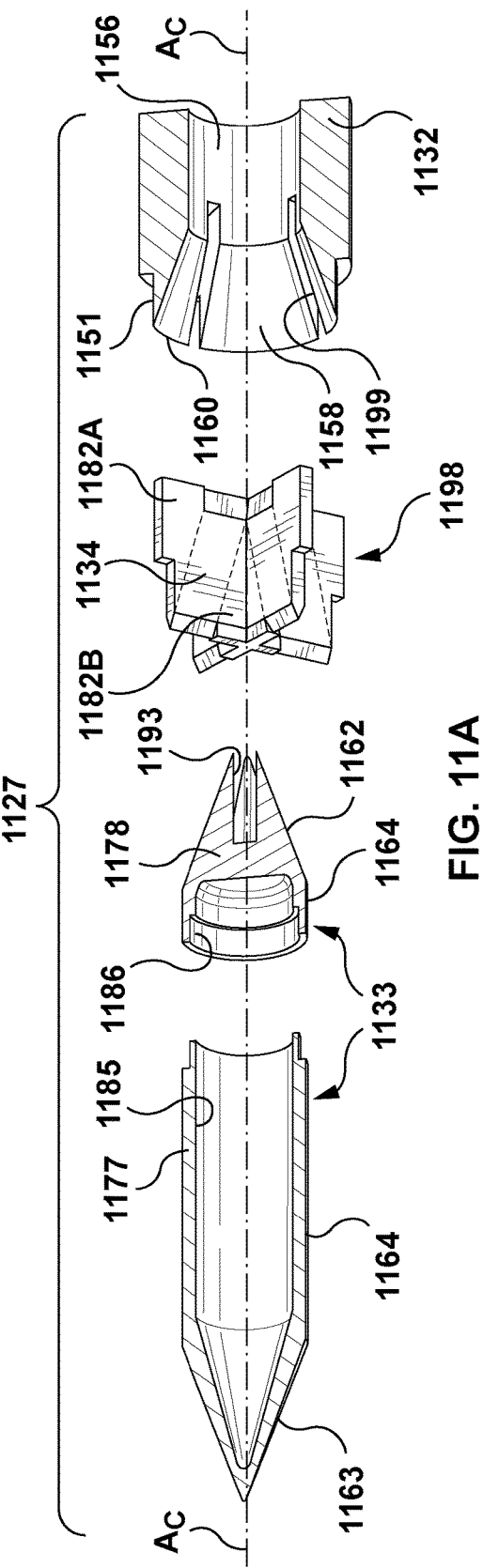
FIG. 11
FIG. 11A

HOT RUNNER NOZZLE TIP AND HOT RUNNER NOZZLE TIP COMPONENTS

CROSS-REFERENCE TO RELATED APPLICATIONS

The present application claims the benefit of U.S. Application No. 62/135,736, filed Mar. 20, 2015, and to U.S. Application No. 62/267,779, filed Dec. 15, 2015, both of which are incorporated by reference in their entirety.

FIELD OF THE INVENTION

The present invention relates to hot runner injection molding, and more particularly to a nozzle tip assembly and to nozzle tip components for use with a nozzle of a hot runner system.

BACKGROUND

Hot runner systems distribute molten molding material, supplied by an injection molding machine, to mold cavities in an injection mold. In many injection molding applications, such as the molding of standardized parts such as closures or the like, large batches of different colored parts are required to satisfy the needs of different end users.

To change the color of parts being molded, a first or current color of molding material is purged from an injection unit of the molding machine using a second or new color of molding material, which is then injected through the hot runner system for a number of injection cycles until the first color of molding material is also purged from the hot runner system. Typically, a large number of injection cycles are required to fully clear the hot runner system of the first color of molding material before useable products of the second color of molding material are formed. Parts formed during color change represent lost production time and wasted molding material as they have an undesirable blend of the two colors of molding material.

Factors which affect the number of shots required to change from a first color of molding material to a second color of molding material include, inter alia, stagnant flow spots in the melt flow passageways, divides in the melt stream passing through the mold gate, an inconsistent volumetric flow rate in the flow passageways, and the viscosity of the molding material as it flows though the mold gate.

Additionally, or aside from lost production time associated with a color change, unidirectional molecular orientation and weld/flow lines can be a potential cause for weakness in the structural integrity, dimensional accuracy, or cause unwanted birefringence of molded products.

SUMMARY OF THE INVENTION

Embodiments hereof are directed to a hot runner nozzle tip for delivering a melt stream of moldable material to a mold cavity. The hot runner nozzle tip includes a tip body having a tip channel extending between a tip inlet at the upstream end of the tip body and a tip outlet at the downstream end of the tip body. The tip channel includes an annular shaped channel portion having a first annular channel segment with a cross-sectional area that increases in size away from the tip inlet, and a second annular channel segment that extends in the downstream direction from the first annular channel segment.

Embodiments hereof are directed to a nozzle tip connectable to a hot runner nozzle. The nozzle tip having an inner tip component and an outer tip component. The inner tip component includes a base with a channel bore extending therethrough, and a torpedo having a first tapered portion, a second tapered portion and an inner extension portion extending the first and second tapered portions. The first tapered portion is surrounded by an expanding portion of the channel bore so as to define a first annular channel segment that extends between the first tapered portion of the torpedo and the expanding portion of the channel bore. An outer tip component having an attachment portion for connecting the nozzle tip to the hot runner nozzle, an outer extension portion projecting from the attachment portion, and a bore extending through the attachment portion and the extension portion. The inner tip component is received in the outer tip component so as to define a second annular channel segment between the inner extension portion of the torpedo and the bore extending though outer tip component, and a third annular channel segment between an external conical surface of the second tapered portion and an internal tapered surface of a contracting portion of the bore that extends through the outer tip component.

Embodiments hereof are directed to a hot runner nozzle tip component for use with a hot runner nozzle. The hot runner nozzle tip component includes a base having a radially expanding channel bore and a torpedo which has an upstream facing conical portion that is positioned relative to the base so as to be surrounded by the radially expanding channel bore, and at least one connector extends between the upstream facing conical portion of the torpedo and the radially expanding channel bore in the base.

Embodiments hereof are directed to a hot runner tip assembly for use with a hot runner nozzle. The tip assembly includes a nozzle tip component having an attachment portion for connecting the tip component to the hot runner nozzle, an extension portion projecting from the attachment portion, and a bore extending through the attachment portion and the extension portion. A sleeve component surrounds the extension portion of the nozzle tip component. The sleeve contacts nozzle tip component at a first contact area and at a second contact area so as to create a void between the first and second contact areas. The first and second contact areas are axially offset from a rib that extends radially outward from this sleeve component.

BRIEF DESCRIPTION OF THE DRAWINGS

The foregoing and other features and advantages of the invention will be apparent from the following description of embodiments thereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIG. 5 is a cross-sectional view of an inner tip component for use with a nozzle tip assembly in accordance with an embodiment hereof.

FIG. 6 is a cross-sectional view of an inner tip component for use with a nozzle tip assembly in accordance with an embodiment hereof.

FIG. 11 is a perspective view of a nozzle tip assembly in accordance with an embodiment hereof.

FIG. 11A is an exploded view of an inner tip component of the nozzle tip assembly of FIG. 11.

DETAILED DESCRIPTION OF THE DRAWINGS

Specific embodiments of the present invention are now described with reference to the figures, wherein like reference numbers indicate identical or functionally similar elements. The following detailed description is merely exemplary in nature and is not intended to limit the invention or the application and uses of the invention. In the following description, "downstream" is used with reference to the direction of mold material flow from an injection unit of an injection molding machine to a mold cavity of a mold, and also with reference to the order of components or features thereof through which the mold material flows from the injection unit to the mold cavity, whereas "upstream" is used with reference to the opposite direction. Furthermore, there is no intention to be bound by any expressed or implied theory presented in the preceding technical field, background, brief summary or the following detailed description.

Figure 1:
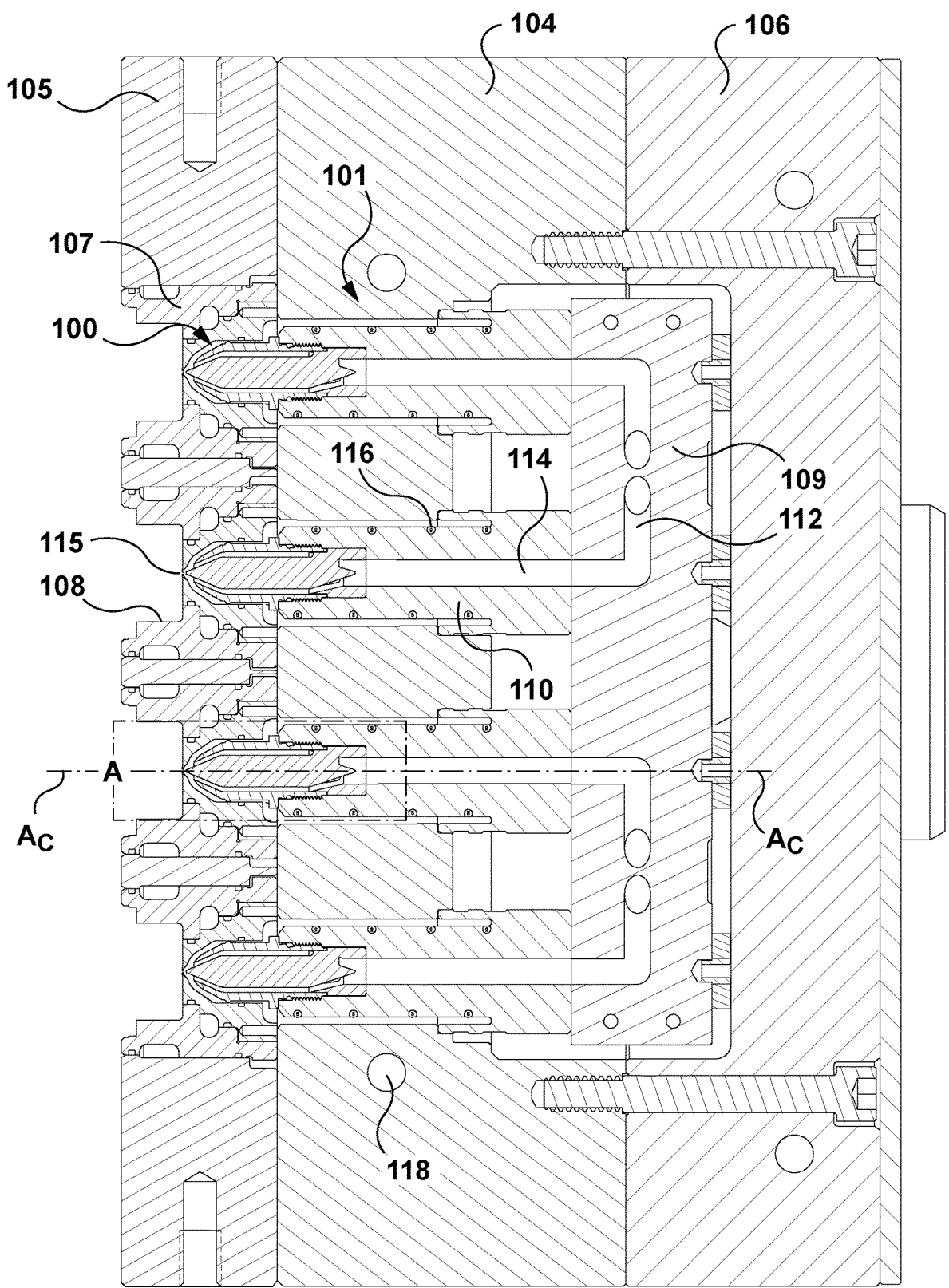
FIG. 1 is a sectional view of a hot runner system having a nozzle tip assembly in accordance with an embodiment hereof.

FIG. 1 is a sectional view of a nozzle tip assembly 100 in accordance with an embodiment hereof that is installed in a hot runner system 101. As discussed herein, nozzle tip assembly 100 can also be referred to as nozzle tip 100. Hot runner system 101 is located between mold plates 104,106, and is configured to route molding material supplied by a molding machine (not shown) to a mold cavity 108 (partially shown in FIG. 1). Hot runner system 101 includes, inter alia, an inlet (not shown), a manifold 109, and a nozzle 110. Manifold 109 includes a manifold channel 112 in fluid communication between an inlet channel extending through the inlet, and a nozzle channel 114 extending though nozzle 110. In operation, molding material supplied by an injection molding machine (not shown) flows though the inlet channel, manifold channel 112, and nozzle channel 114 prior to exiting hot runner system 101, via nozzle tip 100, and entering mold cavity 108 via a mold gate 115. As shown in FIG. 1, mold cavity 108 is defined by a cavity insert 107 that is received in a mold plate 105 which is coupled to a downstream side of mold plate 104.

Manifold 109, and nozzle, 110 are each provided with a heater and a thermocouple, such as heater 116 called out on nozzle 110 only, which, in conjunction with a thermocouple and a temperature controller (neither shown), maintain hot runner system 101 at a suitable processing temperature. The number and type of heaters shown is by way of example and not limitation.

Mold plates 104, 105, 106 are coupled together by suitable fasteners, such as socket head cap screws or the like, and may include, inter alia, additional fastening/aligning features, such as dowels, taper locks, or the like. Further, mold plates 104,105, 106 include cooling conduits or cooling channels, such as cooling channel 118 called out on mold plate 104, through which a temperature regulated fluid, for example, water is circulated to maintain mold plates 104,106 at a suitable molding temperature.

Figure 2:
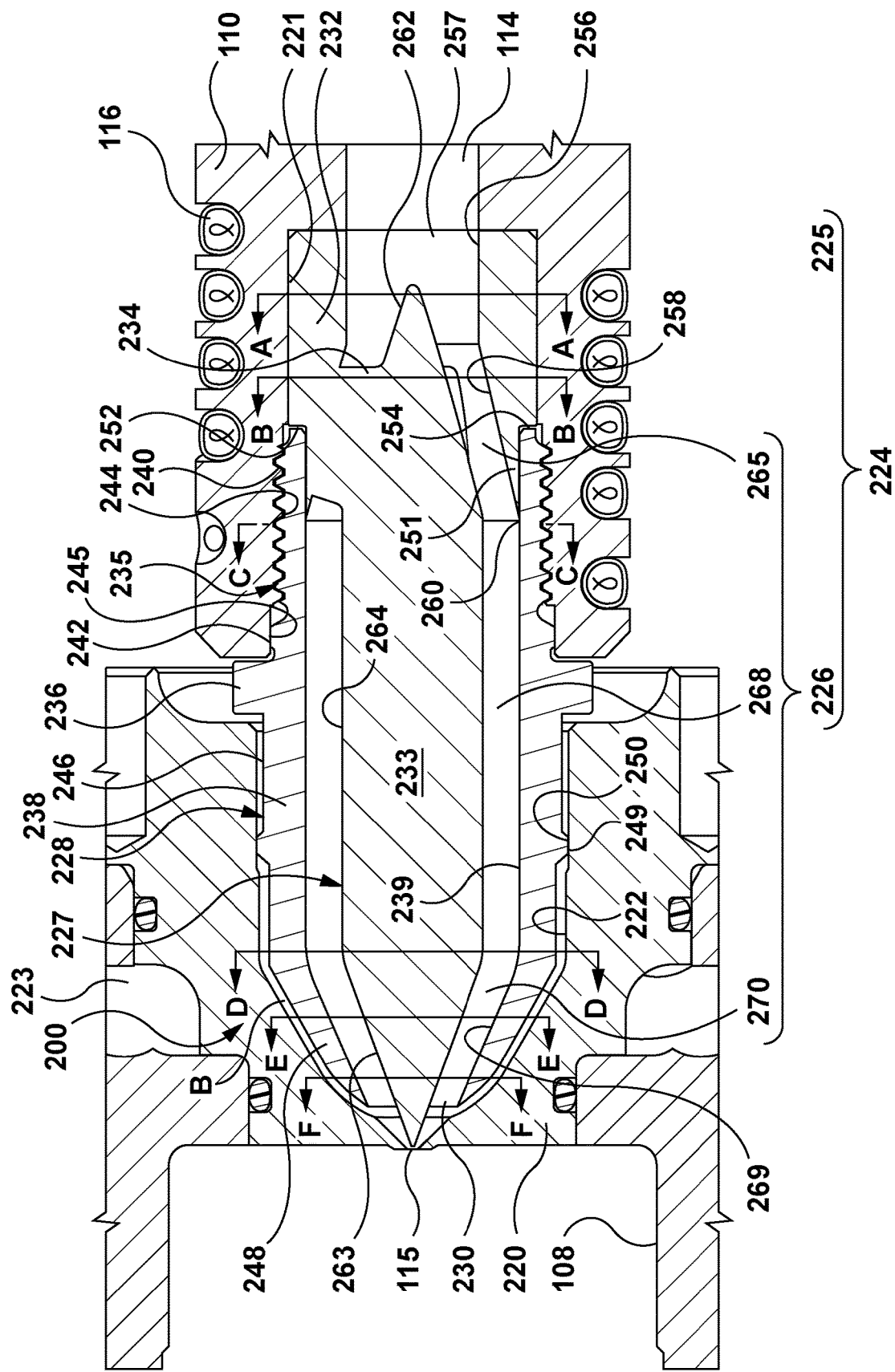
FIG. 2 is an enlarged view of a portion A of FIG. 1 showing the downstream end of a nozzle, the nozzle tip assembly, and portion of a gate insert.

Turning now to FIG. 2, which is an enlarged view of a portion A of FIG. 1 showing the downstream end of nozzle 110, nozzle tip 100, and portion of a gate insert 220 that defines a portion of mold cavity 108. Nozzle channel 114 terminates at a stepped bore 221 in the downstream end of nozzle 110 that is sized to receive nozzle tip 100. When installed, nozzle tip 100 is seated in stepped bore 221 and projects beyond the downstream end of nozzle 110 into an opening 222 in gate insert 220 that terminates at mold gate 115. As shown, the downstream portion of opening 220 has a generally parabolic shape that converges towards mold gate. Gate insert 220 further includes a gate insert cooling channel 223 through which a temperature regulated fluid, for example, water, is circulated to maintain gate insert 220, and more specifically the area of gate insert surrounding mold gate 115, at a suitable temperature that facilitates, inter alia, gate freezing and part separation. Nozzle tip 100 serves as the terminal end of hot runner system 101 through which molding material flows prior to entering mold cavity 108 through mold gate 115. Nozzle tip 100 has a tip channel 224 extending therethrough that changes the shape of the passageway through which molding material flows within hot runner system 101 from being cylindrical shaped within nozzle 110, i.e. having a circular cross-sectional shape, to being tube shaped within nozzle tip 100, i.e. having an annular cross-sectional shape. Tip channel 224 includes a cylindrical shaped portion 225 at an inlet 257 thereof, and an annular shaped portion 226 that continues from cylindrical portion 225 through nozzle tip 100. As discussed herein, cylindrical shaped portion 225 may be referred to as cylindrical tip channel 225, and annular shaped portion 226 may be referred to as annular tip channel 226.

Nozzle tip 100 includes an inner tip component 227 and an outer tip component 228 that are aligned along a central axis $A_C$ that extends through mold gate 115. As shown in FIG. 2, inner and outer tip components 227, 228 are separable components. Together, inner tip component 227 and outer tip component 228 define annular portion 226 of tip channel 224, and also an outlet 230 of hot runner system 101. As shown, inner tip component 227 projects the downstream end of outer tip component 228 such that outlet 230 has an annular shaped cross-section. By way of example and not limitation, inner tip component 227 can be referred to as, for example, tip 227 or torpedo tip 227, and outer tip component 228 can be referred to as, for example, tip retainer 228, transfer seal 228, or gate seal 228. Together inner tip component 227 and outer tip component can be referred to as a tip body 100.

Inner and outer tip component 227, 228 conduct heat from nozzle 110 towards mold gate 115. Inner tip component 227 includes a base 232, a torpedo, 233, and a connector 234 or a plurality of connectors 234 extending between base 232 and torpedo 233. Connectors 234 have an elongate cross-sectional shape that is aligned with central axis $A_C$. In general, from upstream to downstream, a width of each connector widens, and then narrows again. That is, connectors 234 are relatively narrower at their upstream and downstream ends and are relatively wider at a location that is between their upstream and downstream ends. The specific shape chosen for connectors 234 is selected so as to reduce or limit the length of a stagnate area of melt flow at the on the downstream side thereof. In addition to a fin shaped connector 234 having an elliptical or generally elliptical shaped cross-section, other shapes for connector 234 are also contemplated including, for example, a connector 234 having a elongated diamond-shaped cross-section, and a connector 234 having an elongated teardrop-shaped cross-section.

Outer tip component 228 includes an attachment portion 235 and an outer extension portion 238. As shown, outer tip component 228 further includes a tool engagable feature 236 that is positioned between attachment portion 235 and outer extension portion 238. A bore 239 extends through outer tip component 228 such that outer tip component 238 is hollow, and can be considered as generally tubular shaped. Bore 239 defines a portion of the outside boundary of annular tip channel 226, whereas torpedo 233 defines the inside boundary of annular tip channel 226. By way of example and not limitation, inner tip component 227 can be made from tool steel H13 tool steel or M2 high speed tool steel, or can be made from a beryllium copper alloy, or other copper alloy. Also by way of example and not limitation, outer tip component 228 can be made from tool steel, for example, either of the tool steels mentioned above, or can be made from a beryllium copper alloy or other copper alloy. Further, outer tip component 228 can also be made from a material that is relatively more insulating than those listed above, for example, titanium, or a titanium alloy.

Continuing with outer tip component 228, attachment portion 235 includes external threads 240 which cooperate with internal threads 244 defined by stepped bore 221 to couple nozzle tip 100 and nozzle 110 together. Attachment portion 235 can also include an external alignment ring 242 which cooperates with an internal alignment surface 245 at the downstream end of bore 221 to concentrically align nozzle tip 100 and nozzle 110. Tool engagable feature 236 is configured to cooperate with a suitable tool (now shown) to facilitate coupling and decoupling outer tip component 228 and nozzle 110. In the current embodiment, tool engagable feature 236 is a hexagon shaped flange between attachment portion 235 and outer extension portion 238; however other tool engagable shapes are also contemplated.

Continuing with outer tip component 228, outer extension portion 238 extends downstream from attachment portion 235, beyond the downstream end of nozzle 110, and into opening 222. Outer extension portion 238 includes a generally cylindrical segment 246 and a tapered segment 248. The cross-sectional profile of cylindrical segment 246 and tapered segment 248 conform to the shape of opening 222 in gate insert 220 in which nozzle tip 200 is received. A sealing ring or rib 249 extends around cylindrical segment 246 and projects radially outward therefrom. In operation rib 249 contacts a sealing surface 250, which is defined by a cylindrical shaped portion of opening 222, to prevent egress or leakage of molding material therebeyond. Engagement between rib 249 and sealing surface 250 further serves to concentrically align outlet 230 relative to mold gate 115. Downstream from rib 249, outer extension portion 238 is spaced apart from and opening 222 to create a gap, or a so-called gate bubble B therebetween. An inside boundary of gate bubble B is defined the external surfaces of tapered segment 248 and the portion cylindrical segment 246 that is downstream from rib 249. An outside boundary of gate bubble B is defined by the portion of opening 222 in gate insert 220 that is downstream from where rib 249 contacts sealing surface 250. In operation, nozzle tip 200 is spaced apart from gate insert 220 such that bubble B fills with molding material that becomes trapped between gate insert 220 and outer tip component 228 which creates a thermal barrier between nozzle tip 100 and gate insert 220. In the current embodiment, rib 249 is located proximate to the mid-point of the length of cylindrical segment 246 such that upstream from rib 249 outer tip component is also spaced apart from gate insert 220.

Referring now to inner tip component 227, base 232 is seated in bore 221 and includes an alignment portion 251 that is sized to be received within bore 239 in outer tip component 228 to concentrically align inner and outer tip components 227, 228. Further, alignment portion 251 and bore 239 are sized to create a longitudinally extending and circumferential sealing area between inner tip component 227 and outer tip component 228. Alignment portion 251 is sized relative to the remainder of base 232 such that an external shoulder 252 is defined therebetween, and upon which a load surface 254, at the upstream end of outer tip component 228, presses to secure inner tip component 227 within bore 221. A channel bore 256 extends through base 232. Channel bore 256 defines tip inlet 257 at the upstream end of inner tip component, which is sized to interface with nozzle channel 114, as shown, inlet 257 has a circular cross-sectional shape. Channel bore 256 includes an expanding portion 258 that extends flares radially outward in the direction of molding material flow. As shown expanding portion 258 extends through alignment portion 251 and reduces the wall thickness thereof such that alignment portion 251 terminates at an annular edge 260 at the downstream end thereof. In operation, outward pressure against expanding portion 258, created by the flow of molding through expanding portion 258, assists in creating a seal between alignment portion 251 and bore 239.

Continuing with inner tip component 227, torpedo 233 is an elongate body which projects downstream relative to base 232 to conduct heat from nozzle 110 towards mold gate 115. Torpedo 233 includes a first tapered portion 262, a second tapered portion 263, and an extension portion 264 therebetween. First tapered portion 262 is an upstream facing conical portion of torpedo 233 that is positioned relative to base 232 so as to be surrounded by expanded portion 258. First tapered portion 232 transforms the shape of the passageway through which molding material flows from being cylindrical shaped in nozzle channel 114 to being annular shaped in nozzle tip 100. First tapered portion 262 is located at the upstream end of torpedo 233 and has a conical shaped outer surface that radially expands in the direction of molding material flow towards extension portion 264. First tapered portion 262 is positioned relative to base 232 such that it is surrounded by expanding portion 258. First tapered portion 262 is spaced apart from expanding portion 258 to define a first segment 265 of annular tip channel 226, which has a radially expanding or increasing cross-sectional area. First tapered portion 262 and expanding portion 258 define the respective inside and outside boundaries of first segment 265 of annular tip channel 226 which expand radially in the direction of molding material flow. In other words, first segment 265 of annular tip channel 226 can be described as being "funnel-shaped" with an inside boundary of the funnel being formed by first tapered portion 262, and an outside boundary of the funnel shape being formed by expanding portion 258, such that the funnel opens in the downstream direction. In the current embodiment, a vertex of first tapered portion 262 projects upstream into channel bore 256 beyond expanding portion 258, such that an upstream portion of the outside boundary first segment 265 is defined by a portion of channel bore 256 that is upstream from expanding portion 258. In an embodiment (not shown), base 232 and inlet portion 257 of channel bore 256 are shorter than shown in FIG. 2 such that first tapered portion 262 of torpedo 233 projects beyond the upstream end of base 232 and into nozzle channel 114 thus creating a tip channel 224 that is annular shaped throughout the length of nozzle tip 100. As shown in FIG. 2, first tapered portion 262 and expanding portion 258 are generally parallel to each other. In other words the size of a gap between an inside channel wall of the first annular channel segment 265, which is defined by first tapered portion 262, and an outside channel wall of the first annular channel segment 265, which is defined by expanding portion 258 is constant along a length of first annular channel segment 265.

In an alternative embodiment (not shown), with reference to the direction of the flow of molding material, first tapered portion 262 and expanding portion 258 are configured to converge towards each other in the downstream direction. For example, first tapered portion 262 can have a 30° included cone angle, whereas expanding portion 258 can have a 26° included cone angle, thus creating a 2° converging taper therebetween. In other words the size of a gap between an inside channel wall of first annular channel segment 265, which is defined by first tapered portion 262, and an outside channel wall of the first annular channel segment 265, which is defined by expanding portion 258, diminishes along a length of the first annular channel segment 265. This converging taper arrangement can in some instances at least partially compensate for the change in the volumetric flow rate of molding material on the narrowing downstream side of connectors 234 that might otherwise occur if not for the taper angle. Further, in another alternative embodiment (not shown) from the upstream end of expanding portion 258 to the longitudinal mid-point of fin 234, first tapered portion 262 and expanding portion 258, have the same taper angle, i.e. the radial distance therebetween is constant; beyond the mid-point of fin 234, the taper angles of first tapered portion 262 and expanding portion 258 are selected so as to converge towards each other. For example, from the upstream end of expanding portion 258 to the longitudinal mid-point of fin 234, first tapered portion 262 and expanding portion 258 can both can have a 30° included cone angle; beyond the longitudinal midpoint of fin 234, the included cone angle of first tapered portion 262 is still 30°, however the included cone angle of expanding portion 258 is less than 30°, for example, to 24° thus creating a 3° converging taper between first tapered portion 262 expanding portion 258 from the longitudinal mid-point of connector 234 and beyond. Such an arrangement can at least partially compensate for the change in the volumetric flow rate of molding material on the downstream side of connectors 234 that might otherwise occur if not for the taper angle.

Inner tip component 227 is received in outer tip component 228 so as to define a second annular channel segment 268 between inner extension portion 264 and bore 239. Inner extension portion 264 is surrounded by bore 239, and is spaced apart therefrom to define second annular segment 268 of tip channel 224, which is surrounded by nozzle 110 at is upstream end, and extends beyond nozzle 110 and into opening 222 in gate insert 220. Inner extension portion 264 and bore 239 define the respective inside and outside boundaries of a second segment 268 of annular tip channel 226, which, in the current embodiment, has a relatively constant cross-sectional area or size along the length thereof. As shown in FIG. 2, the outer cylindrical surface of inner extension portion 264 and the inner cylindrical surface of bore 239 are generally parallel to each other, meaning that the distance between inner extension portion 264 and bore 239 is constant along the length of second annular channel segment 268. In other words, the cross-sectional area of second annular channel segment 268 is constant between first annular channel segment 265 and a third annular channel segment 270. However, in an alternative embodiment (not shown), with reference to the direction of the flow of molding material, inner extension portion 264 and bore 239 are shaped so as to converge towards each other, which increases shear heating and the volumetric flow rate of the molding material ahead of third segment 270, which, in some applications, encourages the flow molding material around the curve between a cylindrical portion of bore 239 and a contracting portion 269 of bore 239, and may also help to recombine molding the divides in molding material created by connectors 234.

Second tapered portion 263 is a downstream facing conical portion of torpedo 233 at the downstream end of torpedo 233 which has a conical shaped outer surface that radially contracts in the direction of molding material flow towards mold gate 115. As shown, second tapered portion 263 extends through outlet 230 such that a vertex of second tapered portion 263 is located downstream from outer tip component 228, and is adjacent to mold gate 115. Second tapered portion 263 is positioned relative to outer tip component 228 such that second tapered portion 263 is surrounded by contracting portion 269 of bore 239 that extends through tapered segment 248 of outer extension portion 238 to outlet 230. Second tapered portion 263 is spaced apart from contracting portion 269 to define a third segment 270 of annular tip channel 224 which has a radially contracting or diminishing cross-sectional area. Second tapered portion 263 and contracting portion 269 of bore 239 define the respective inside and outside boundaries of the third segment 270 of annular tip channel 226 which contracts radially with the direction of flow of molding material. In other words, third segment 270 of annular tip channel 226 can be described as being "funnel-shaped" with an inside boundary of the funnel being formed by second tapered portion 263, and an outside boundary of the funnel shape being formed by contracting portion 269 of bore 239 such that the funnel opens in the upstream direction. As shown in FIG. 2, second tapered portion 263 and contracting portion 269 are generally parallel to each other, meaning that the distance between second tapered portion 263 and tapered segment 248 is constant along the length of third annular channel segment 270.

In an alternative embodiment (not shown), with reference to the direction of the flow of molding material, second tapered portion 263 and contracting portion 269 are configured to converge slightly towards each other. For example, second tapered portion 263 can have a 40° included cone angle, whereas contracting portion 269 can have a 48° included cone angle, thus creating a 4° converging taper therebetween. In other words the size of a gap between an inside channel wall of third annular channel segment 270, which is defined by second tapered portion 263, and an outside channel wall of third annular channel segment 270, which is defined by contracting portion 269 diminishes along a length of the third annular channel segment 270. This converging channel arrangement increases the volumetric flow rate of molding material in third annular segment 270, ahead of outlet 230 more than if the converging taper were not present. In some applications, such a converging arrangement can improve the rate of color change by flushing away molding material at the tip outlet 230.

As used herein, the terms "cone", "conical", "tapered" etc. are not limited to a shapes which, when viewed in cross-section, have straight or linear sides that extend towards each other, but also includes cone-like shapes which, when viewed in cross-section have curved or arcuate sides that extend towards each other, and are either concave or convex relative to central axis $A_C$.

As mentioned above, connector 234 extends between torpedo 233 and base 232 or more specifically between expanding portion 258 and first tapered portion 262 such that connector 234 extends across first segment 265 of annular tip channel 226 to suspend torpedo 233 within bore 239 of outer tip component 228. Connector 234 also serves as a bridge or pathway though which heat from nozzle 110, i.e. from heater 116, is conducted or transferred to torpedo 233. Connector 234 divides or apportions at least a portion of first segment 265 of annular tip channel 226 into a number of arcuate channel segments, the number of arcuate channel segments being equal to the number of connectors 234 used to connect torpedo 233 to base 232. For example, as shown in FIG. 2, inner tip component 227 includes three connectors 234 (only two are visible in FIG. 2) which are evenly spaced around torpedo 233, and extend between first tapered portion 262 and expanding portion 258. Accordingly, each of the three connectors 234 extends across first segment 265 of annular tip channel 226 to divide at least a portion of first segment 265 into three arcuate channel segments 265A, 265B. 265C (shown in FIG. 2B). Connectors 234 are placed proximate to an upstream end of torpedo 233 in order to give molding material that is divided by connectors 234A, 234B, 234C sufficient time or distance to sufficiently merge back together prior to entering mold gate 115 as a single melt stream. Connectors 234A, 234B, 234C, and an upstream portion of second segment 268 (of annular tip channel 226) that is downstream from connectors 234A, 234B, 234C, and where molding material that is divided by connectors 234A, 234B, 234C begins to merges together, are disposed within a portion of nozzle 110 that is surrounded by nozzle heater 116. In the current embodiment, an upstream end of connector 234 projects radially outward from first tapered portion 262 at an angle that is perpendicular to central axis $A_C$, whereas a downstream end of connector projects radially outward from torpedo 233 at an angle that is perpendicular to the taper angle selected for first tapered portion 262.

Connectors 234 are provided in the form of elongate fins that are aligned with central axis $A_C$. An upstream end of connector 234 (fin) can project radially outward from first tapered portion 262 at an angle that is perpendicular to central axis $A_C$, whereas a downstream end of connector 234 (fin) can project radially outward from torpedo 233 at an angle that is perpendicular to the taper angle selected for first tapered portion 262, as is shown in FIG. 2.

Figure 2A:
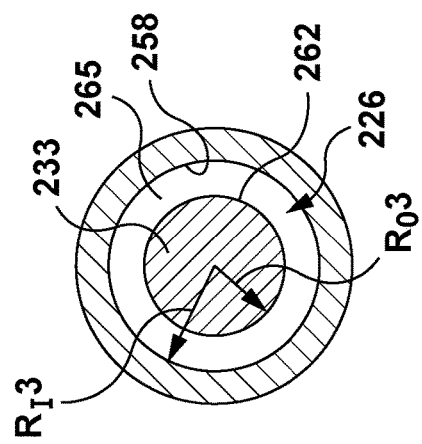
FIG. 2A is a cross-sectional view of FIG. 2 taken along line A-A.
Figure 2B:
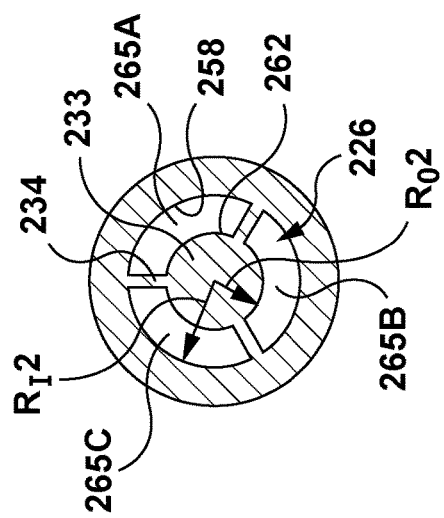
FIG. 2B is a cross-sectional view of FIG. 2 taken along line B-B.
Figure 2C:
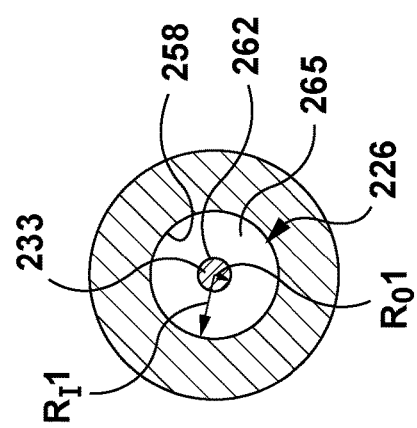
FIG. 2C is a cross-sectional view of FIG. 2 taken along line C-C.

Continuing with FIG. 2, and also referring to FIG. 2A, FIG. 2B, and to FIG. 2C, which are cross-sectional views of FIG. 2 taken along lines A-A, B-B, and C-C respectively, which show the radial expansion of annular tip channel 226 at the upstream end or torpedo 233. As shown in FIG. 2A, at a first position in annular tip channel 226, first tapered portion 262 and expanding portion 258 are sized so as to have respective first radii $R_O1$ and $R_I1$. As shown in FIG. 2B, at a second position in annular tip channel 226, which is downstream from the first position shown in FIG. 2A, first tapered portion 262 and expanding portion 258 are sized so as to have respective have respective second radii $R_O2$ and $R_I2$ which are both greater than respective first radii $R_O'$ and $R_I1$. Also visible in FIG. 2B, connectors 234 (three shown) have apportioned first segment 265 of annular melt channel 226 into three arcuate channel segments 265A, 265B, 265C. As shown in FIG. 2C, at a third position in annular tip channel 226, which is downstream from the first and second positions shown in FIGS. 2A and 2B, first tapered portion 262 and expanding portion 258 are sized so as to have respective third radii $R_O3$ and $R_I2$ which are greater than respective second radii $R_O2$ and $R_I2$ and respective first radii $R_O1$ and $R_I1$.

Figure 2D:
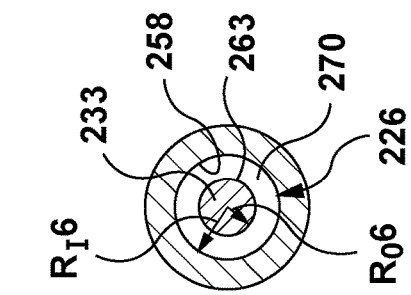
FIG. 2D is a cross-sectional view of FIG. 2 taken along line D-D.
Figure 2E:
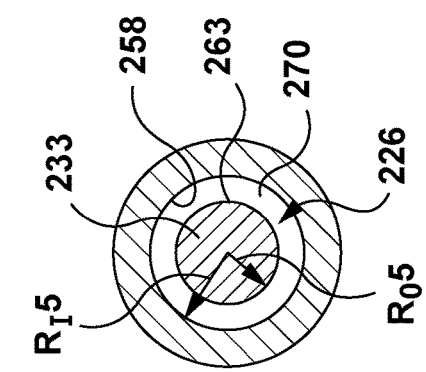
FIG. 2E is a cross-sectional view of FIG. 2 taken along line E-E.
Figure 2F:
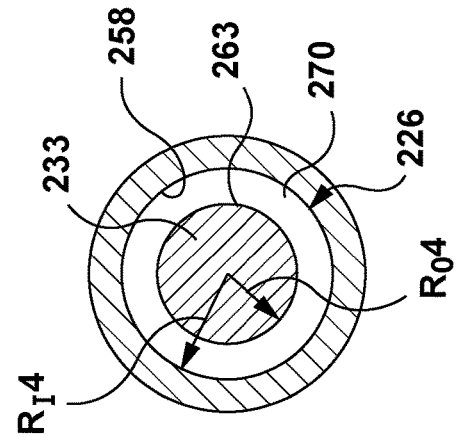
FIG. 2F is a cross-sectional view of FIG. 2 taken along line F-F.

Continuing with FIG. 2 and also referring to FIG. 2D, FIG. 2E, and to FIG. 2F, which are cross-sectional views of FIG. 2 taken along lines D-D, E-E, and F-F respectively, which show the radial contraction of annular tip channel 226 at the downstream end or torpedo 233. As shown in FIG. 2D, at a fourth position in annular tip channel 226 second tapered portion 263 and contracting portion 269 have respective fourth radii $R_O4$ and $R_I4$ which are equal to or substantially equal to respective third radii $R_O3$ and $R_I2$ of first tapered portion 262 and expanding portion 258. As shown in FIG. 2E, at a fifth position in annular tip channel 226, which is downstream from the fourth position shown in FIG. 2D, second tapered portion 263 and contracting portion 269 have respective fifth radii $R_O2''$ and $R_I2''$ which are less than respective fifth radii $R_O5$ and $R_I5$. As shown in FIG. 2F, at a sixth position in annular tip channel 226 which is downstream from the fourth and fifth positions shown in FIGS. 2E and 2F, second tapered portion 263 and contracting portion 269 have respective sixth radii $R_O6$ and $R_I6$ which are less than respective fifth radii $R_O5$ and $R_I5$.

As molding material flows through nozzle channel 114, it travels through a passageway that has a circular shaped cross-section. Upon encountering torpedo 233 the cross-sectional shape of passageway changes from being circular shaped to being annular shaped. First tapered portion 262 at the upstream end of torpedo 233 in combination with expanding portion 258 of channel bore 256 in base 232 progressively increase the internal and external boundaries of annular tip channel 226 and direct the annular flow of molding material radially outward around torpedo 233 to at least partially compensate for the cross-sectional channel restriction, and volumetric flow rate reduction that would have otherwise been created if not for radially expanding first segment 265 of annular tip channel 226.

Furthermore, from upstream to downstream, the increase in the radii of the inner and outer boundaries of first annular channel segment 265 progressively increases the cross-sectional area of annular tip channel 226 relative to the cross-sectional area of cylindrical tip channel 225. By positioning connector(s) 234 to extend across first annular channel segment 265, the restriction, and accompanying pressure drop and volumetric flow rate restriction caused thereby, can also be at least partially compensated for by the increase in the cross-sectional area of first annular channel segment 265.

Radially expanding first segment 265 of annular tip channel 226 reduces the change in the volumetric flow rate and pressure drop of the flow of molding material as the passageway through which molding material flows changes from being cylindrical shaped and having an circular cross-section to being tubular shaped and having an annular cross-section, including instances where a portion of the annular shaped passage way is made up of a plurality of arcuate channel segments. Furthermore, the arrangement of inner tip component 227 and outer tip component 228 to form first and second annular channel segments 265, 268 establishes a relatively constant flow rate in tip channel 224, and avoid significant pressure drop until third segment 270 of annular tip channel 226, wherein as the cross-sectional area third segment 270 decreased towards outlet 230, and the flow rate of molding material increases to flush molding away molding material from subsequent injection cycles.

Depending on the material from which inner tip component 227 is made, the entire inner tip component 227 or a portion of inner tip component 227, for example, portions of inner tip component 227, which in operation, are exposed to flowing molding material, can be coated or plated. A non-limiting example a suitable coating includes nickel plating, which can be used, for example to improve the corrosion resistance of inner tip component 227. Similarly, depending on the material from which outer tip component 228 is made, the entire outer tip component 228 or a portion of outer tip component 228, for example, portions of outer tip component 228, which in operation, are exposed to flowing molding material, can be coated or plated. A non-limiting example a suitable coating includes nickel plating, which can be used, for example to improve the corrosion resistance of outer tip component 228.

Figure 3:
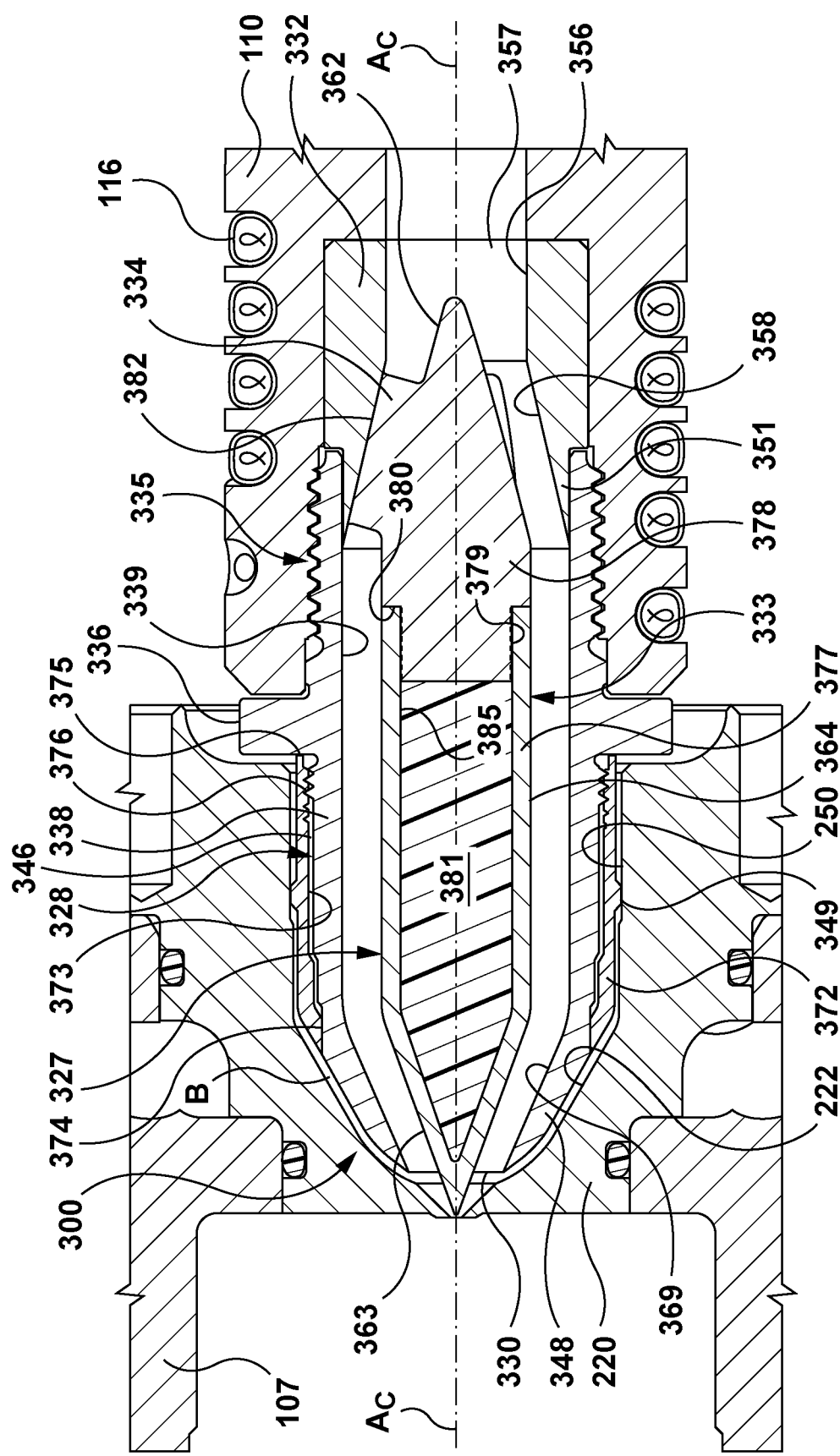
FIG. 3 is a cross-sectional view of the downstream end of a nozzle, a portion of a gate insert, and a nozzle tip assembly in accordance with another embodiment hereof.

Turning now to FIG. 3, which is an cross-sectional view of the downstream end of nozzle 110, gate insert 220, and a nozzle tip assembly or nozzle tip 300 in accordance with another embodiment hereof. Features and aspects of the current embodiments can be used accordingly with the other embodiments. Nozzle tip 300 has a central axis $A_C$, about which an inner tip component 327 and an outer tip component 328 are aligned. In the current embodiment nozzle tip further includes a sleeve component or sleeve 372 that is attached to outer tip component 328. Inner and outer tip components 327, 328 are separable components. Inner tip component 327 includes a base 332, a torpedo, 333, and a connector 334 extending therebetween. In the current embodiment inner tip component 327 is an assembly of components which are integrally joined together by, for example, vacuum brazing or by another suitable attachment method. Outer tip component 328 includes an attachment portion 335, a tool engagable feature 336, an outer extension portion 338, and a bore 339 extending therethrough. By way of example and not limitation, outer tip component 328 can be made from a beryllium copper alloy, for example Mold Max® HH available from Materion Brush Performance Alloy of Ohio, U.S.A.

Sleeve 372 surrounds outer extension portion 338 and is coupled thereto. Sleeve 372 is made from a material that is less thermally conductive than the material from which outer tip component 328 is made, a non-limiting example of which may include a tool steel such as H-13 or an even less thermally conductive material such as, for example, titanium. Further, sleeve 372, or a portion of sleeve 372, for example rib 349, can be coated with, for example, a ceramic such as aluminum oxide in order to enhance the insulative characteristics of sleeve 372 by even further reducing the amount of heat that is transferred to gate insert 220.

Sleeve 372 is generally tubular shaped and includes a rib 349 that extends circumferentially therearound and projects radially outward therefrom relative to central axis $A_C$. The downstream end of sleeve 372 is shaped so as to create a seamless or relatively seamless interface with a tapered segment 348 of outer extension portion 338. That is, the downstream end of sleeve 372 and tapered segment 348 both taper inward at the same taper angle which conforms to the taper angle at the downstream end of opening 222 in gate insert 220. Rib 349 mates with sealing surface 250, which is a part of opening 222 in gate insert 220, when nozzle 110 is installed in mold plate 104. Rib 349 and sealing surface 250 are sized to prevent egress or leakage of molding material into the opening in which hot runner system 101 is received. Engagement between rib 349 and sealing surface 250 further serves to concentrically align nozzle tip 300 relative to mold gate 115 such that mold gate 155 is also aligned with central axis $A_C$. Downstream from rib 349, sleeve 372 and tapered segment 348 of outer tip component 328 are spaced apart from and opening 222 to create a gap, or a so-called gate bubble B therebetween. Mating engagement between rib 349 and sealing surface 250 defines an upstream end of gate bubble B. Adding sleeve 372 to outer tip component 328 creates dual material inside boundary for gate bubble B. That is, an inside boundary of an upstream portion of gate bubble B is defined sleeve 372, more specifically the portion of sleeve 372 that is downstream from rib 349, and an inside boundary of a downstream portion of gate bubble B is defined outer tip component. As shown, the external surface of tapered segment 348. An outside boundary of gate bubble B is defined by the portion of opening 222 that is downstream from where rib 349 contacts sealing surface 250. In operation, molding material gate bubble B fills with molding material that becomes trapped between gate insert 220 and sleeve 372 and tapered segment 348 which creates a thermal barrier between nozzle tip 300 and gate insert 220.

Sleeve 372 is sized relative to outer extension portion 338 so as to create a void 373 therebetween. To facilitate this, sleeve 372 contacts outer tip component 328 at a first contact area, shown at location 374, and at a second contact area, shown at location 375 which is spaced apart from first contact area 374. Void 373 extends around outer tip component 328 between first and the second contact areas 375, 375. Void 373 reduces the amount of thermal energy that is transferred from nozzle 110 to gate insert 220 by reducing the contact area between outer tip component 328 and sleeve 372. In the current embodiment, first contact area shown at location 374 is between an inner circumferential surface at the downstream end of sleeve 372 and an outer circumferential surface of outer extension portion 338, and second contact area shown at location 375 is between an upstream facing end of sleeve 372 and a downstream facing shoulder of outer tip component 328, which, as shown in FIG. 3, is defined by tool engagable feature 336. In the current embodiment, outer tip component 328 can be made from a relatively more thermally conductive material than in the previous embodiment, since contact between tip assembly 300 and gate insert 220 is limited to the contact made between sleeve 372 and sealing surface 250. Upstream from rib 349, sleeve 372 is also spaced apart from gate insert 220.

As shown, sleeve 372 is coupled to cylindrical segment 346 via a threaded connection therebetween as shown at 376, which in the current embodiment, creates an interruption in void 373 between first and second contact locations 374, 375. The threaded connection between sleeve 373 and outer tip component 328 facilitates a removable coupling arrangement between sleeve 372 and outer tip component 328. In this embodiment, sleeve 372 can also be provided with a suitable tool engagable feature 376, for example, so-called "wrench flats" in order to simplify coupling and decoupling of sleeve 372 and outer tip component 328. In an alternative embodiment (not shown) sleeve 372 and outer tip component 328 are fused together by, for example, electron beam welding at contact locations 374 and 375 or 376.

To reduce heat loss from outer tip component 328 to gate insert 220, the contact areas between sleeve 372 and outer tip component 328, shown at locations 374, 375 are axially offset or spaced apart from the contact area between rib 349 and sealing bore 250 such that the length of heat loss pathway between outer tip component 328 and gate insert 220 is greater than the radial distance between outer tip component 328 and sealing surface 250. That is, first contact area, shown at location 374, is downstream from rib 349, and second contact area, shown at location 375, is upstream from rib 349. Accordingly, heat loss from outer tip component 328 to gate insert 220 is limited to a first pathway that extends between the first contact area, shown at location 374 and rib 349, and to a second pathway that extends between the second contact area, shown at location 375 and rib 349. According to this arrangement, the length of the first pathway not only includes the radial distance between outer tip component 328 and sealing surface 250, but also includes the axial distance between the first contact area, shown at location 374 and rib 349, which is greater than the radial distance. Also, the length of the second pathway includes the axial distance between the second contact area, shown at location 375 and rib 349, which is also greater than the radial distance between outer tip component 328 and sealing surface 250. As shown, rib 349 extends around sleeve 372 at, or proximate to, the axial mid-point of sleeve 372, such that the respective lengths of the first and second pathways are equal or substantially equal. Also as shown in FIG. 3, the threaded engagement between sleeve 372 and outer tip component 328, shown at location 376 (which is another contact area between outer tip component and sleeve 372), is offset from rib 349, so as to create another heat loss pathway therebetween that is also greater than the radial distance between outer tip component 328 and sealing surface 250.

Referring now to inner tip component 327, base component or base 332 includes an alignment portion 351 that is received in the upstream end of outer tip component 328. A channel bore 356 extends through base 332 which defines an inlet 357 sized to interface with nozzle channel 114. Channel bore 356 further includes an expanding portion 358, having an internal conical surface which tapers radially outward in the downstream direction.

Continuing with inner tip component 327, torpedo 333 includes a shell component or shell 377 that is attached to a tail component or tail 378. Shell 377 defines a second tapered portion 363 at the downstream end of torpedo 333, and a portion of an inner extension portion 364. Similar to the previous embodiment, second tapered portion 363 is positioned relative to outer tip component 328 such that it is it is surrounded by a contracting portion 369 of bore 339 that continues through tapered segment 348 of outer extension portion 338. Shell 377 has an opening 385 that extends through the portion of inner extension portion 364 defined thereby, and into second tapered portion 363. As shown in FIG. 3, the wall thickness of shell 377 is relatively constant along the length of inner extension portion 364 and second tapered portion 363. The remainder of inner extension portion 364 and a first tapered portion 362 at the upstream end of torpedo 333 are defined by tail 378. Tail 378 has a boss 379 that is sized to be received in opening 385 such that shell 377 and tail 378 are attached together along a shouldered interface, as shown at location 380 to form an enclosed chamber 381 which, as shown, is filled with copper, for example, UNS C10100 copper or another material that is more conductive that the material from which shell 377 and tail 378 are made. Copper filled chamber 381 increases the overall thermal conductivity of torpedo 333, which assists in conducing heat from nozzle 110 (i.e. from heater 116) towards mold gate 115. By way of example and not limitation, base 332, shell 377, and tail 378 can be made from tool steel, for example H13 tool steel or M2 high speed tool steel, i.e., materials that are harder and/or more resistant than the material within chamber 381, so as to be able to withstand abrasion from flowing molten molding material.

In an alternative embodiment (not shown), tail 378 is removably attached to the remainder of torpedo 333 by a threaded connection therebetween. For example, tail 378 can be removably attached to inner extension portion 364, which can be defined by shell 377, or by a solid torpedo, by a threaded connection therebetween at a location that corresponds to location 380. Such an arrangement facilitates making the torpedo out of dissimilar materials.

In the current embodiment, tail 378 further includes three connectors 334 (only two are visible in FIG. 3) that project radially outward from tail 378 an angle that is perpendicular to the taper angle selected for first tapered portion 362. Connectors 334 have respective mating surfaces 382 which are shaped to engage with the expanding portion 358 of channel bore 356. Engagement between respective mating surfaces 382 expanding portion 358 align torpedo 333 relative to base 332. Further, torpedo 333 is attached to base 332 by attaching connectors 334 and base 332 together along mating surfaces 382, by, for example, vacuum brazing. In an alternate embodiment (similar to the embodiment shown in FIG. 5), base 332 includes connectors 334 which project radially inward from expanding portion 358 which have mating surfaces that are sized to engage with first tapered portion 362 at the upstream end of torpedo 333.

Figure 4:
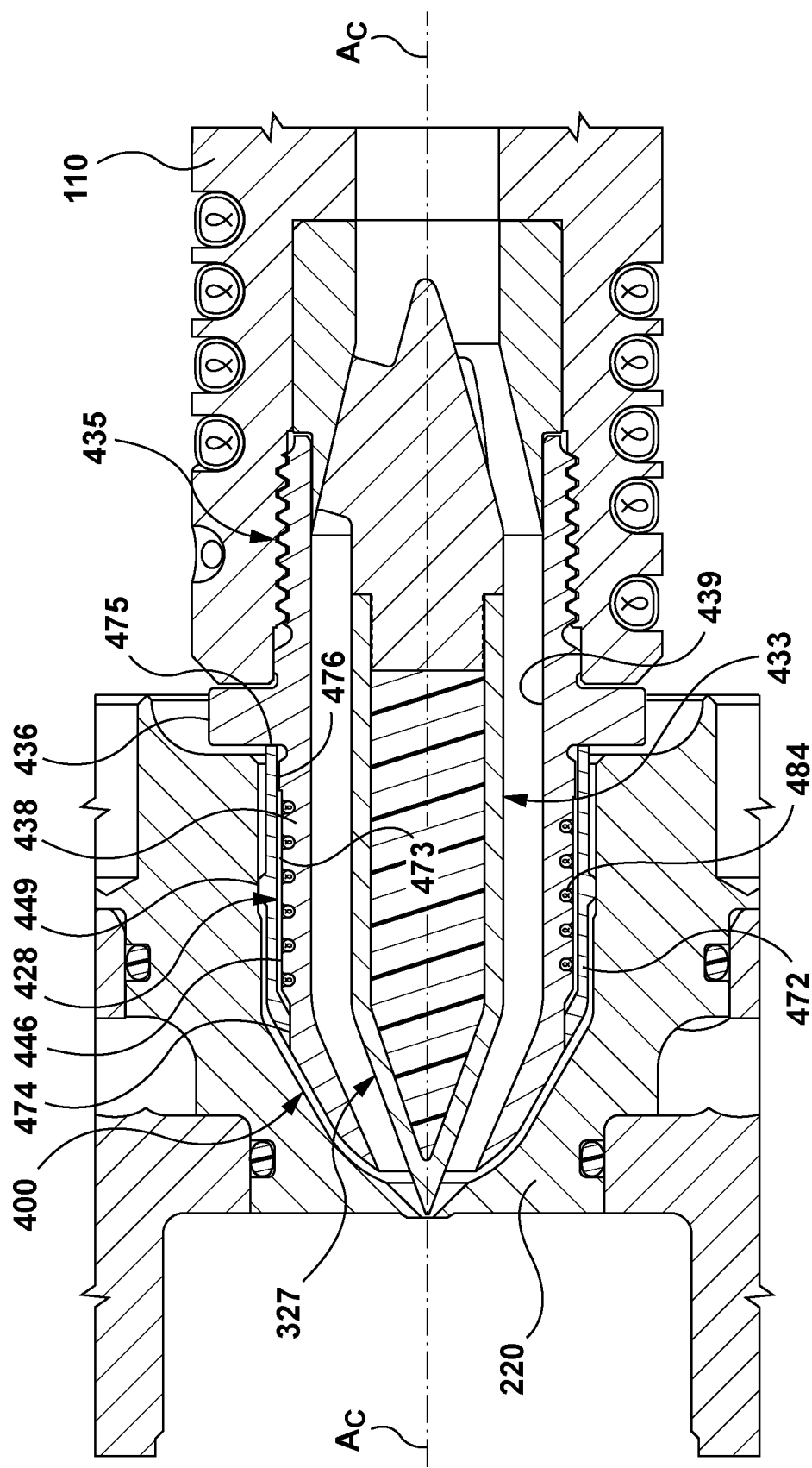
FIG. 4 is a cross-sectional view of the downstream end of a nozzle, a portion of a gate insert, and a nozzle tip assembly having an outer tip component in accordance with another embodiment hereof.

Turning now to FIG. 4, which is an cross-sectional view of the downstream end of nozzle 110, gate insert 220, and a nozzle tip assembly or nozzle tip 400 having an outer tip component 428 in accordance with another embodiment hereof. Features and aspects of the current embodiments can be used accordingly with the other embodiments. Nozzle tip 400 has a central axis $A_C$ extending centrally therethrough. In the current embodiment outer tip component 428 further includes a heater 484. Outer tip component 428 includes an attachment portion 435, a tool engagable feature 436, an outer extension portion 438 that extends from attachment portion 435, and a bore 439 that extends therethrough. A sleeve 472, which is coupled to a cylindrical segment 446 of extension portion 435, has a sealing ring or rib 449 extending radially therefrom. Sleeve 472 contacts outer extension portion 438 at a first circumferential contact area, shown at 474, and at a second circumferential contact area, shown at 476 which is spaced apart from first contact area 474 to create a void 473 between first and second contact areas 474, 476. Void 476 has an annular cross-sectional shape that extends between first and second circumferential contact areas 474, 476. Sleeve 472 is coupled to the outside surface of cylindrical segment 446 via an interference fit at one or both of first and second contact areas 474, 475. As shown in FIG. 4, sleeve 472 further contacts outer tip component 428 at a third location 475 which is between an upstream end sleeve 472 and tool engagable feature at a third location 475.

Heater 484 is positioned between first and second contact areas 474, 476, such that void 473 extends around heater 484. As shown, heater 484 is disposed in a groove that extends helically around outer extension portion 438. Sleeve 472 further includes an opening (not shown) through which wires (not shown) associated with heater 484 are routed to ultimately connect with a controller. Heater 484 can be activated during color change to improve the flushing of the existing molding material with the new molding material by reducing the viscosity of molding material at the downstream end of tip channel 424. In addition, heater 484 could be activated during mold start-up and/or during production if it is desirable to increase the amount of heat at mold gate 115.

Turning now to FIG. 5, which is a cross-sectional view of an inner tip component 527 for use with a nozzle tip assembly 500 in accordance with another embodiment hereof. Features and aspects of the current embodiments can be used accordingly with the other embodiments. Inner tip component 527 includes a base component or base 532, a torpedo, 533, and at least one connector 534 extending between base 532 and torpedo 533. In the current embodiment inner tip component 527 is an assembly of components that are integrally coupled together by, for example, vacuum brazing or by another suitable attachment method.

Base 532 includes an alignment portion 551. A channel bore 556 extends through base 532 which defines an inlet 557 that is sized to interface with a nozzle channel (not shown in FIG. 5). Channel bore 556 includes an expanding portion 558, having an internal conical surface, which opens outwardly in the downstream direction through alignment portion 551, and terminates at an annular edge 560.

Torpedo 533 includes a shell component or shell 577 and a tail component or tail 578. Shell 577 defines a second tapered portion 563 at the downstream end of torpedo 533, and a portion of an inner extension portion 564. Shell 577 has an opening 585 that extends into second tapered portion 563. The remainder of inner extension portion 564 and a first tapered portion 562 at the upstream end of torpedo 533 are defined by tail 578. In the current embodiment tail 578 has another opening 586 that continues from opening 585 and into first tapered portion 562. As shown in FIG. 5, the wall thickness of shell 577 is relatively constant, as is the wall thickness of tail 578. Shell 577 and tail 578 are attached together along a shouldered interface, as shown at 580, which aligns shell 577 and tail 578 with central axis $A_C$. Together, shell 577 and tail 587 form a chamber 581 defined by openings 585 and 586 that extends into first tapered portion 562 in shell 577 and into second tapered portion 563 in tail 578. As shown, chamber 581 is filled with copper, for example UNS C10100 copper, or another other or other another material that is more conductive than the material form which shell 577 and tail 578 are made. Sizing chamber 581 extend into both first and second tapered portions 562, 563 increases the quotient of thermally conductive material in torpedo 533, which thereby increases the thermal conduction properties of inner tip component 527. By way of example and not limitation, base 532, shell 577, and tail 578 can be made from tool steel, for example H13 tool steel or M2 high speed tool steel.

In the current embodiment, base 532 further includes a plurality of connectors 534 (only two are visible in FIG. 5), which project radially inward from an internal conical surface of expanding portion 558. Connectors 534 have respective mating surfaces 582 which are shaped to mate with first tapered portion 562 at the upstream end of torpedo 533, and by which torpedo 533 is attached to base 532, for example, by way of vacuum brazing or by another suitable attachment method. In an alternative embodiment, (similar to the embodiment shown in FIG. 6) base, connector 534 and tail 578 can be manufactured as a unitary component by, for example, an additive manufacturing process, such as laser sintering, or by, for example, a casting process, such as investment casting.

Turning now to FIG. 6, which is an cross-sectional view of an inner tip component 627 for use with nozzle tip assembly 600 in accordance with another embodiment hereof. Features and aspects of the current embodiment can be used accordingly with the other embodiments. Inner tip component 627 includes a base 632, a torpedo, 633, and a connector 634 extending therebetween. Central axis $A_C$ extends through the centers of base 632 and torpedo 633. In the current embodiment inner tip component 627 is an assembly of components that are integrally coupled together by, for example, vacuum brazing or by another suitable attachment method. An alignment portion 651 projects from base 632 in the downstream direction which sized to be received in an outer tip component (not shown in FIG. 6). A channel bore 656 extends through base 632 which defines an inlet 657 that is sized to interface with a nozzle channel (not shown in FIG. 6). Channel bore 656 includes an expanding portion 658 that has concave shape that faces or opens in the downstream direction. In the current embodiment, base 632 further includes a first tapered portion 662 of torpedo 633, and also includes an upstream portion of inner extension portion 664. A plurality of connectors 634 (only one visible in FIG. 6) extend between expanding portion 658 and first tapered portion 662. Base 632 has an opening 686 extends into the portion of inner extension portion 664 defined thereby, and into first tapered portion 662. The remainder or downstream portion of inner extension portion 664, and second tapered portion 663 of torpedo 633, are both defined by a shell component or shell 677. Shell 677 has an opening 685 that extends into the portion of inner extension portion 664 defined thereby, and into second tapered portion 663.

Shell 677 and base 632 are attached together along an abutment interface, as shown at 680, by for example electron beam welding, such that openings 685 and 686 create a chamber 681 within torpedo 633. In the current embodiment, each connector 634 has an opening 686' that extends from chamber 681, or more specifically, from opening 686, and into base 632 such that chamber 618 extends into each connector 634. As shown opening 686', connects with a depression 687 that extends into the downstream end of base 632 such that chamber 684 extends through base to the upstream end thereof. As shown depression 687 is an annular groove in the downstream end of base 632.

In an alternative embodiment opening 686' extends outward through an outer cylindrical surface of base 632 such that chamber 681 extends through to the outer cylindrical surface of base 632. As shown, chamber 681, opening 686' and groove 687 are filled with copper, for example UNS C10100 copper, or other conductive material which is exposed at an upstream end or outer cylindrical surface of base 632 to be in direct contact with a nozzle not shown in FIG. 6). Contact between copper filled groove 687 and a heated nozzle (for example, between groove 687 and stepped bore 221 in nozzle 110) or between opening 686' and a heated nozzle (for example, between groove 686' and stepped bore 221 in nozzle 110) increases the amount of heat transfer from a nozzle to torpedo 633, and also increase overall quotient of relatively more thermally conductive in torpedo 633 which promotes heat transfer towards the mold gate due to the direct contact between the exposed copper and the heated nozzle. By way of example and not limitation, base 632 and shell 677 can be made from tool steel, for example H13 tool steel or M2 high speed tool steel.

Figure 7:
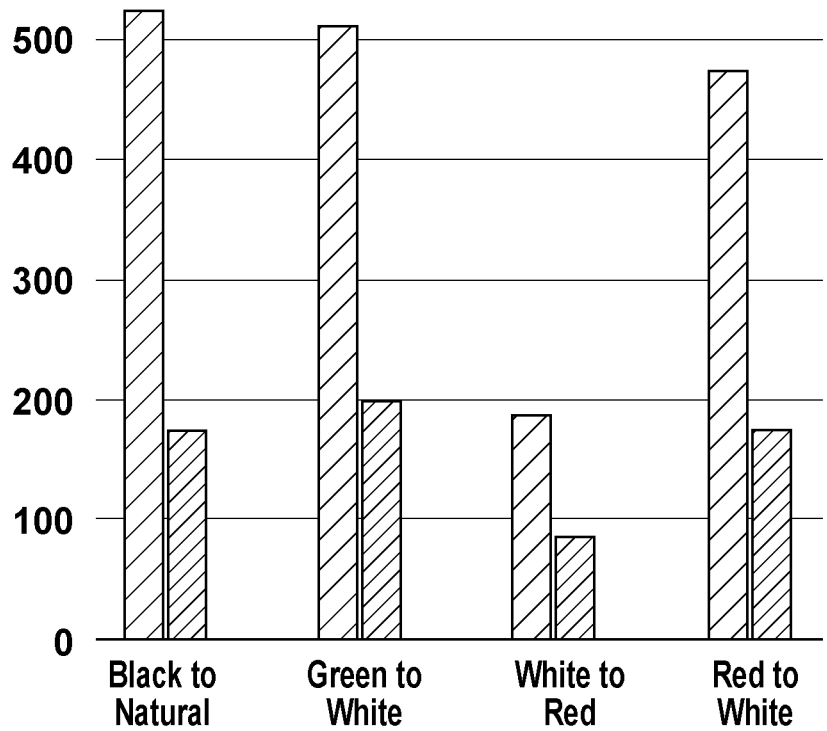
FIG. 7 is a series of graphs showing color change comparisons between the nozzle tip assembly of FIG. 3 and a known nozzle tip.
Figure 8:
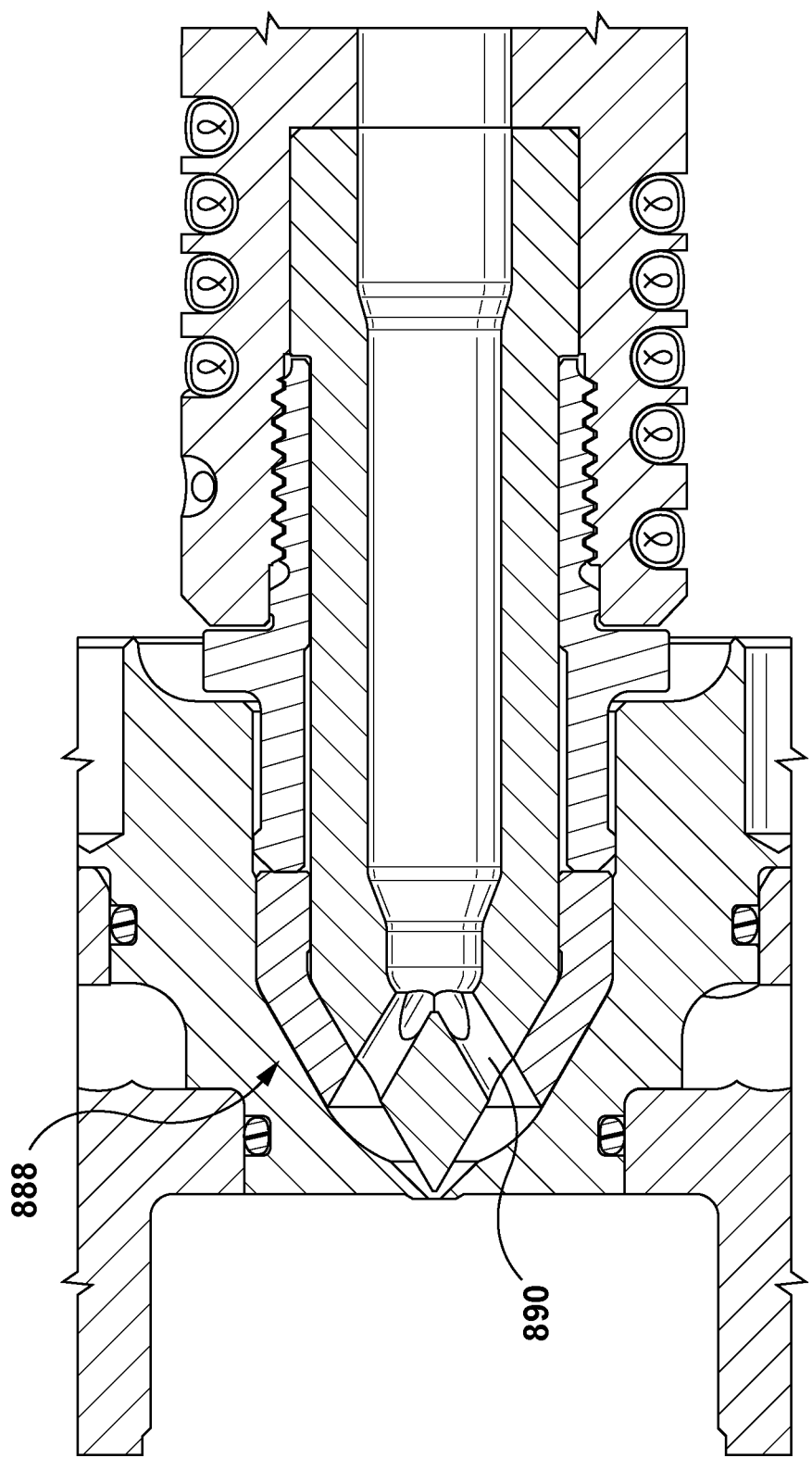
FIG. 8 is a cross-sectional view of the downstream end of a nozzle, a portion of a gate insert, and the known nozzle tip assembly referred to in FIG. 7.

Referring now to FIG. 7, which is a series of graphs showing color change comparisons between nozzle tip 300, shown in FIG. 3, and a known nozzle tip 888, and also referring to FIG. 8 which is a cross-sectional view of the known nozzle tip 888 installed in nozzle 110 and received in gate insert 220. Nozzle tip 888 has a plurality of spaced apart exit holes 890 in the downstream end thereof that divides the flow of molding material into a plurality of molding material streams is it exits nozzle tip. Tests have shown that nozzle tip 300 reduces the number of shots required to change from molding parts of a first or current color to molding parts of a second or new color in comparison to the number of shots required to change from molding parts of the first or current color to molding parts of the second or new color when using the known hot runner nozzle tip 888.

Figure 9:
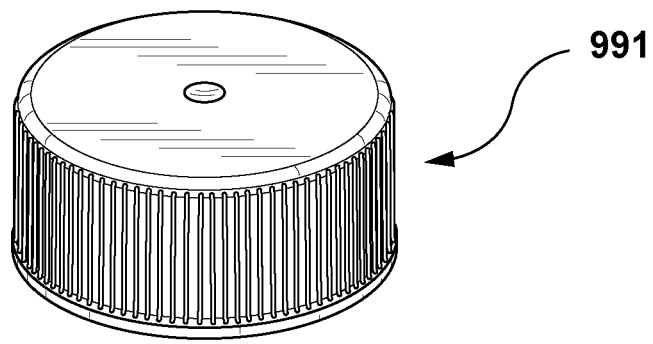
FIG. 9 is a perspective representation of a closure molded in the color change comparisons referred to in FIG. 7.

In each test a sixteen nozzle hot runner system, having Mold Masters® Master Series® Deci nozzles, was used to deliver polypropylene molding material, having a melt flow index of 35, to a mold that is configured to mold sixteen closures, each being similar to the representative image of a closure 991 shown in FIG. 9, during each injection cycle.

In each test, known nozzle tips 888 were installed in each nozzle and a first color of molding material was supplied to the hopper in an injection molding machine to mold closures made from a molding material having a first color. Once the molding process stabilized, a set of sixteen closures made with the first color of molding material cycle in one injection cycle were collected. Molding was halted, and the injection unit of the molding machine was retracted from the mold, and purged with molding material of a second color. After purging, the injection unit was reengaged with the mold, a shot counter was reset to 'zero', and molding recommenced. Sets of parts were collected, and the shot number of each set was noted. The color of the parts in each of the sets of shots was measured and averaged to establish an average part color per shot number. This value was then used to determine the exact number of injection cycles used to change from molding parts of a first color to molding parts of a second color using known tip 888. Next, nozzle tips 300 in accordance with the embodiment described having regard to FIG. 3 were installed into each nozzle, and the above described process was repeated. More specifically, nozzle tips 300 used in the test were configured as follows: Base 332, shell 377, and tail 378 were forms as individual components, made from H13 tool steel, that were coupled together by vacuum brazing, and chamber 381 defined within shell 377 was filled with UNS C10100 copper. Outer tip component 328 was made from Mold Max® HH (available from Materion Brush Performance Alloy of Ohio, U.S.A.); and sleeve 372 was made titanium and was attached to outer tip component 328 by a threaded connection as shown in FIG. 3.

In a first test, black molding material was substituted for natural or uncolored molding material. Using known nozzle tips 888, it was observed that it took more than 500 shots or injection cycles to change from black colored closures to natural polypropylene closures. In comparison, it was observed that it took less than 200 shots or injection cycles to change from black colored closures to natural polypropylene closures using nozzle tips 300.

In a second test, green molding material was substituted for white molding material. Using known nozzle tips 888, it was observed that it took more than 500 shots or injection cycles to change from green colored closures to white colored closures. In comparison, it was observed that it took around 200 shots or injection cycles to change from green colored closures to white colored closures using nozzle tips 300.

In a third test, white molding material was substituted for red molding material. Using known nozzle tips 888, it was observed that it took nearly 200 shots or injection cycles to change from white colored closures to red colored closures. In comparison, it was observed that it took less than 100 shots or injection cycles to change from white colored closures to red colored closures using nozzle tips 300.

In a fourth test, red molding material was substituted for white molding material. Using known nozzle tips 888, it was observed that it took nearly 500 shots or injection cycles to change from red colored closures to white colored closures. In comparison, it was observed that it took less than 200 shots or injection cycles to change from red colored closures to white colored closures using nozzle tips 300.

In the above described process, a CM 700d Spectrophotometer and SpectraMagic™ NX software both available from Konica Minolta of Tokyo, Japan, were used to quantify the color changes. In each of the above described tests, it was observed that color changes using nozzle tips 300 reduced the number of shots or injection cycles required to change from molding part of a first color to molding parts of a second color compared to using known nozzle tips 888, which reduces the amount of wasted molding material and lost production time that is typically required to make a color change.

Figure 10:
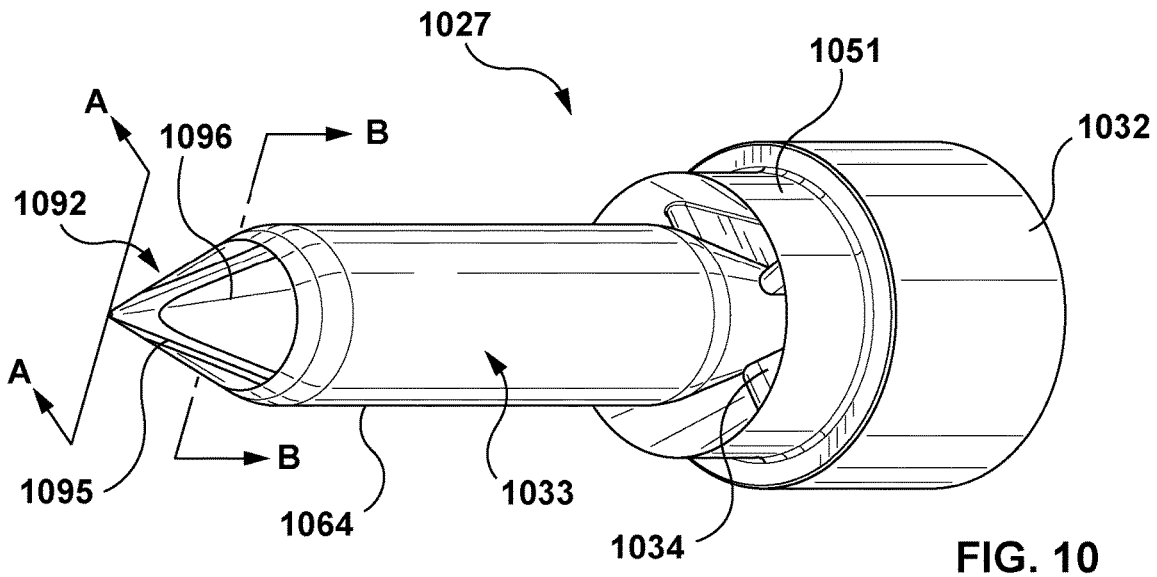
FIG. 10, is a perspective view of an inner tip component for use with a nozzle tip assembly in accordance with an embodiment hereof.
Figure 10A:
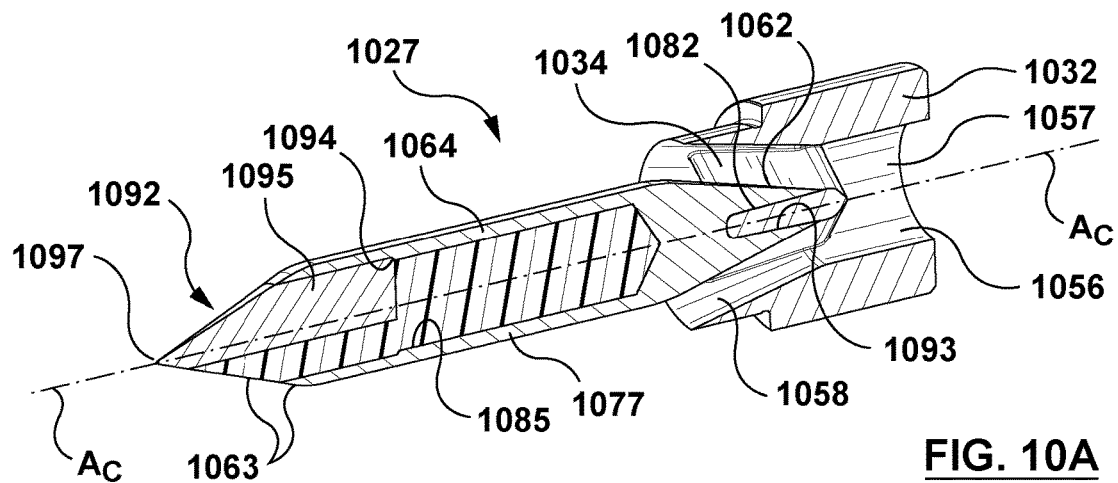
FIG. 10A is a perspective sectional view taken along line A-A of FIG. 10.
Figure 10B:
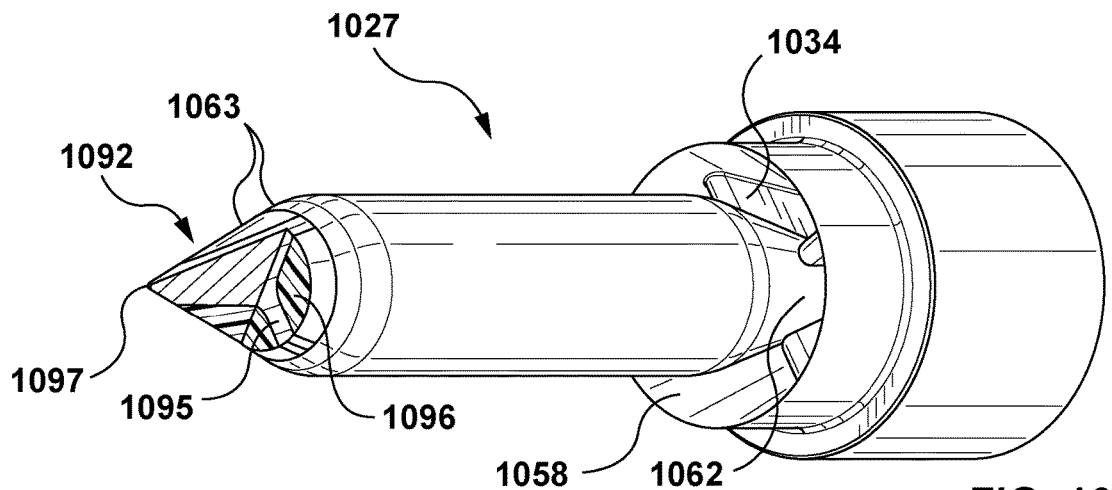
FIG. 10B is a perspective a quarter-cut sectional view taken along lines A-A and B-B of FIG. 10.

Turning now to FIG. 10, which is a perspective view of an inner tip component 1027 for use with a nozzle tip assembly 1000 in accordance with another embodiment hereof, and also referring to FIG. 10A, which is a perspective sectional view of inner tip component 1027 taken along line A-A of FIG. 10, and to FIG. 10B, which is a perspective a quarter-cut sectional view of inner tip component 1027 taken along lines A-A and B-B of FIG. 10. Features and aspects of the current embodiment can be used accordingly with the other embodiments. Inner tip component 1027 includes a base component or base 1032, a torpedo, 1033, and at least one connector 1034 extending between base 1032 and torpedo 1033. In the current embodiment inner tip component 1027 is an assembly of components that are integrally coupled together by, for example, vacuum brazing or by another suitable attachment method.

Torpedo 1033 includes a shell component or shell 1077 and an insert 1092 that projects from a downstream end of shell 1077. Shell 1077 defines a first tapered portion 1062 of torpedo 1033 that has an expanding conical surface at the upstream end of torpedo 1033, and an inner extension portion 1064 that extends from first tapered portion 1062. Shell 1077 further defines a portion of a second tapered portion 1063 at the downstream end of torpedo 1033. In the current embodiment, at its upstream end, shell 1077 includes a plurality of slots 1093 (only one of which is visible in FIG. 10A) that extend radially outward from central axis $A_C$ through first tapered portion 1062. In the current embodiment shell 1077 includes four slots 1093 that are disposed at right angles to each other so as to form a cross-shaped recess extending into first tapered portion 1062.

As shown in FIG. 10A, an opening 1085 extends axially into the downstream end of shell 1077 in which insert 1092 is received. As shown, opening 1085 extends into inner extension portion 1064; however, opening 1085 can extend further into torpedo 1033 than is shown in FIG. 10A. For example, opening 1085 can extend beyond inner extension portion 1064 and at least partially into first tapered portion 1062. At its downstream end, opening 1085 can include an internal shoulder 1094 which defines a seat against which insert 1092 abuts. Insert 1092 includes a plurality of fins 1095 that extend radially outward relative to central axis $A_C$. In the current embodiment insert 1092 has three fins 1095 (one of which is visible in FIG. 10A, and two of which are visible in FIGS. 10 and 10B) that are evenly spaced around central axis $A_C$ so as to apportion a downstream portion of opening 1085 into a plurality of longitudinally extending sectors 1096 that are defined between adjacent fins 1095 and an inner surface of shell 1077. A cross-section of each sector 1096 can be described as being generally pie-shaped as is visible in FIG. 10B.

As shown, opening 1085, as well as sectors 1096 between adjacent fins 1095, are filled with copper, for example, UNS C10100 copper, or another other or other conductive material so as to transmit heat towards the mold gate. In its finished form, the copper between adjacent fins 1095, as well as the portions of fins 1095 that project beyond shell 1077 are shaped to form a downstream portion of second tapered portion 1063 that extends from the portion of second tapered portion 1063 that is formed by the downstream end of shell 1077. That is, together, the copper between adjacent fins 1095, as well as the portions of fins 1095 that project beyond shell 1077 have a conical outer surface, which that radially contracts in the direction of molding material flow. According to this configuration, a vertex 1097 of second tapered portion 1063, formed by converging fins 1095, has relatively high wear resistant properties. Also according to this configuration, the conically profiled copper sectors 1096 between each pair of adjacent fins 1095, in operation, are exposed to the flow of molding material, which, in some applications, can assist with providing heat torpedo 1033 due to the shear heating of the exposed copper created by flowing molding material.

Base 1032 includes an alignment portion 1051 that is sized to be received in an outer tip component. A channel bore 1056 extends through base 1032 which defines an inlet 1057, which is sized to interface with a nozzle channel (not shown in FIG. 10), and also defines an expanding portion 1058 that has an internal conical surface that opens outwardly in the downstream direction through alignment portion 1051 and terminates at an annular edge 1060.

Base 1032 further includes a plurality of connectors 1034 that converge radially inward from expanding portion 1058. The number of connectors 1034 is equal in number to the number of slots 1093 at the upstream end of shell 1077. In the current embodiment, base 1032 includes four connectors 1034 that are disposed at right angles to each other so as to form a cross-shaped structure that extends within channel bore 1056. Each slot 1093 is sized to receive a mating surface 1082 of a respective connector 1034, and the torpedo 1033 being attached to the base 1032. Engagement between respective connectors 1034 and slots 1093 locates shell 1077 relative to base 1032 such that a centerline of torpedo 1033 and a centerline of channel bore 1056 are aligned with central axis $A_C$, and the torpedo is attached to the base 1023 along the engagement between respective slots and connectors by, for example, vacuum brazing or another suitable attachment method. By way of example and not limitation, base 1032, shell 1077, and insert 1078 can be made from tool steel, for example H13 tool steel or M2 high speed tool steel.

Referring now to FIG. 11, which is a sectional perspective view of a nozzle tip assembly 1100 in accordance with another embodiment hereof, and also referring to FIG. 11A, which is an exploded and partially sectioned view of an inner tip component 1127 of nozzle tip 1100. Features and aspects of the current embodiments can be used accordingly with the other embodiments. Nozzle tip 1100 includes inner tip component 1127 and outer tip component 328. In the current embodiment inner tip component 1127 is an assembly of components that are integrally coupled together by, for example, vacuum brazing or by another suitable attachment method. Inner tip component 1127 includes a base component or base 1132, a torpedo, 1133, and a connector component 1198 that extends between base 1032 and torpedo 1133.

Torpedo 1133 includes a shell component or shell 1177 and a tail component or tail 1178. Shell 1177 defines a second tapered portion 1163 at the downstream end of torpedo 1133, and also defines a portion of an inner extension portion 1164. Shell 1177 has an opening 1185 that extends into the portion of inner extension portion 1164 defined thereby, and also into second tapered portion 1163. The remainder of inner extension portion 1164 and a first tapered portion 1162 at the upstream end of torpedo 1133 are defined by tail 1178. Tail 1178 includes another opening 1186 that extends into the remainder of inner extension portion 1164 defined by tail 1178. Shell 1177 and tail 1178 are attached together along a shouldered interface, as shown at 1180, to create a chamber 1181, formed by openings 1185 and 1186, which extends within inner extension portion 1164 and second tapered portion 1163. Although shown hollow, similar to the previously described embodiments, chamber 1181 can be filled with copper, for example UNS C10100 copper, or another other or other conductive material so as to increase the amount of relatively thermally conductive material in torpedo 1133.

Tail 1178 includes a plurality of slots 1193 (two of which are visible in FIG. 11A) that extend radially outward relative to central axis $A_C$, and through first tapered portion 1162. In the current embodiment tail 1178 includes four slots 1093 that are disposed at right angles to each other so as to form a cross-shaped recess extending into first tapered portion 1062.

Base 1132 includes an alignment portion 1151 sized to be received in bore 339 of outer tip component 328 so as to create a longitudinally extending circumferential seal therebetween when nozzle tip 1100 is installed in a nozzle, for example nozzle 110 shown in FIG. 1. A channel bore 1156 extends through base 1132 which defines an inlet 1157 that is sized to interface with a nozzle channel (not shown in FIG. 11). Channel bore 1156 includes an expanding portion 1158 that has an internal conical surface which opens outwardly in the downstream direction through alignment portion 1151 and terminates at an annular edge 1160.

Base 1132 includes a plurality of slots 1199 (two of which are visible in FIG. 11A) that extend radially outward relative to central axis $A_C$, through a downstream end of base 1132. As shown, the plurality of slots extend radially outward through alignment portion 1151 and a portion of the remainder of base 1132. The number and angular orientation of slots 1199 in base 1132 is equal to the number and angular orientation of slots 1193 in torpedo 1133. In the current embodiment, like torpedo 1133, base 1132 includes four slots 1199 that are disposed at right angles to each other so as to form a cross-shaped recess that extends through alignment portion 1151 and into base 1132.

Connector component 1198 includes a plurality of connectors 1134 that extend radially outward relative to central axis AC. The number and the angular orientation of connectors 1134 is equal to the number and angular orientation of slots 1193 in torpedo 1133 and slots 1199 in base 1132. As shown, connector component 1198 includes four connectors 1134 that are disposed at right angles to each other so as to form a cross-shaped structure that extends, in the upstream direction, past expanding portion 1158 and into channel bore 1156 and, in the downstream direction, as shown in FIG. 11, partially into the upstream end of bore 339.

Each connector 1134 has a first mating surface 1182A that sized to be received in a respective slot 1199 in base, and has a second mating surface 1182B that is sized to be received in a respective slot 1193 in torpedo 1133. Engagement between connector component 1198 and base 1132 and between connector component 1198 and tail 1178 locates torpedo 1133 relative to base 1132 such that torpedo, 1133 connector 1198, and base 1132 are coaxial along central axis AC. Connector component 1198 is attached to base 1132 along the engagement between each first mating surface 1182A and a respective slot 1199, and connector component 1198 is attached to torpedo 1133 along the engagement between each second mating surface 1182B and a respective slot 1193 in torpedo 1133. Attachment between the connector component 1198, base, 1132, and torpedo, can be accomplished by, for example, vacuum brazing or another suitable attachment method. As shown, the outside profile of each connector 1134 is shaped to correspond to the outside profile of base 1132 and alignment portion 1151, such that each connector includes an upstream facing shoulder 1152. By way of example and not limitation, base 1132, shell 1177, and tail 1178 can be made from tool steel, for example H13 tool steel or M2 high speed tool steel.

In a alternative embodiment (not shown) a plurality of connectors 1134, either formed by connector component 1198 or otherwise, are attached to first tapered portion 1162, and base 1132 includes a plurality of slots 199 extending outward through a downstream end thereof, each slot 1199 is sized to receive a respective connector 1198. Rather than being permanently attached to base 112, torpedo 1133 is secured to base 1132 by axial force against a downstream facing shoulder 1152 on each respective connector 1134. Such axial force could be provided by, for example a load surface 1154 at the upstream end of outer tip component 1128.

The specific combinations of inner and outer tip components as described herein are made by way of example and not limitation, as each of the inner tip components described herein can be used in combination with each of the outer tip components described herein. Further, each of inner and outer tip components can be supplied separately to a user for use with a hot runner nozzle, for example, as a replacement component to be used with an existing inner or outer tip component, rather than being supplied in pairs. Further, in the previously described embodiments, the outer tip components are described in combination with inner tip components having a torpedo that is suspended with the outer tip component by connectors that extend across a radially expanding annular tip channel; however, the outer tip components described herein, can also be used in combination with other tip members, for example, a tip member 1202 that is described with regard to FIG. 12.

Figure 12:
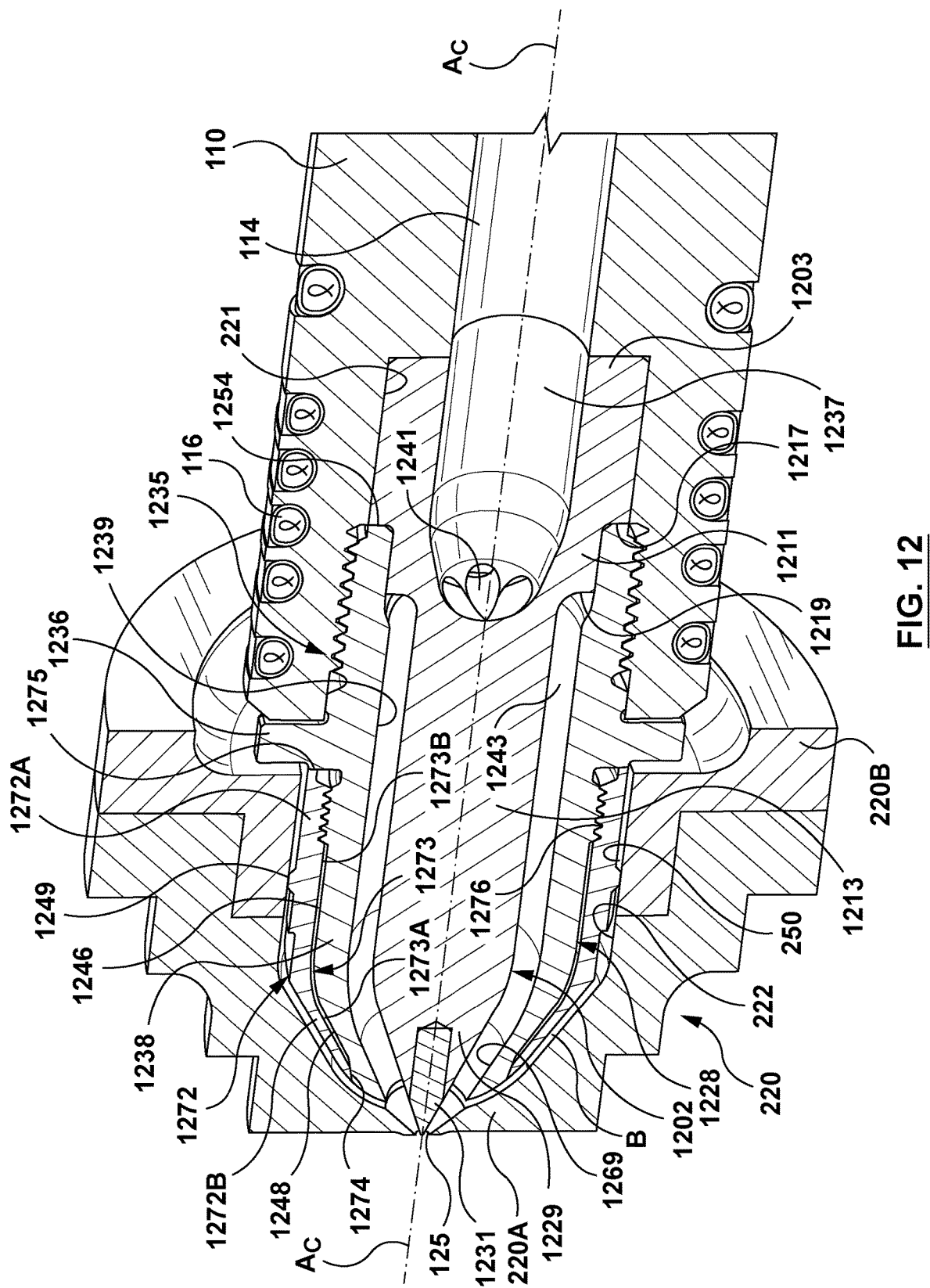
FIG. 12 is a perspective sectional view of the downstream end a nozzle, a gate insert, and a nozzle tip assembly having an outer tip component and a tip member in accordance with an embodiment hereof.

Turning now to FIG. 12, which is a perspective sectional view of a nozzle 110, and a nozzle tip in accordance with an embodiment hereof having an outer tip component 1228 and tip member 1202. Features and aspects of the previous embodiments can be used with the current embodiment. Nozzle 110 has nozzle melt channel 114 extending therethrough which terminates at a stepped bore 121. Tip member 1202 is received in stepped bore 121 and projects beyond the downstream end of nozzle 110. Tip member 1202 includes a first section 1203 that is sized to be seated in stepped bore 121, a second section 1211 that projects in the downstream direction from first section 1203, and a third section 1213 that projects in the downstream section from second section 1211. First second and third sections 1203, 1211, 1213, are all generally cylindrical shaped, and respective diameters of first, second, and third sections 1203, 1211, 1213 decrease in size so as to form a first shoulder 1217 that is between first section 1203 and second section 1211, and a second shoulder 1219 that is between second section 1211 and third section 1213. At its downstream end, third section 1213 includes a cone shaped portion 1229 that points towards mold gate 125 in gate insert 220. As shown, a vertex of cone shape portion 1229 is defined by a wear insert 1231 that fixed within third section 1213. Wear insert 1231 is optional depending on the particular molding application in which tip member 1202 is used.

Tip member 1202 is made from a material that is suitable for conducting heat from nozzle 110 towards mold gate 125. A non-limiting example such a material includes a copper alloy. Depending on the material from which it is made, tip member 1202 or portions of tip member 1202, for example, portions of tip member 1202, which in operation, are exposed to flowing molding material, can be coated or plated. A non-limiting example a suitable coating includes nickel plating, which can be used, for example to improve the corrosion resistance of tip member.

Outer tip component 1228 includes an attachment portion 1235, a tool engagable feature 1236, an outer extension portion 1238, and a bore 1239 extending therethrough. Second section 1211 is received in an enlarged upstream end of bore 1239. Outer extension portion 1238 extends downstream from attachment portion 1235 and into opening 222. Outer extension portion 1238 includes a generally cylindrical segment 1246 and a tapered segment 1248, the outside surfaces of which generally conform to the shape of opening 222 in gate insert 220. An upstream end of outer tip component 1228 includes a load surface 1254 which presses against first shoulder 1217 to secure tip member 1201 within bore 221.

A sleeve 1272 surrounds outer extension portion 338 and is coupled thereto. In the current embodiment, sleeve 1273 includes a first sleeve portion 1272A and a second sleeve portion 1272B. First sleeve portion 1272A surrounds cylindrical segment 1246 and is generally parallel to central axis $A_C$. Sleeve 1272 is coupled to outer tip component 1228 via a threaded connection between first sleeve portion 1272A and outer tip component 1228 as is shown at location 1276. Sleeve 1272 can also be provided with a suitable tool engagable feature to facilitate coupling and decoupling of sleeve 1272 and outer tip component 1228. The threaded engagement between sleeve 1272 and outer tip component facilitates substituting sleeve 1272 if, for example, sleeve becomes damaged, or if it is desirable to substitute sleeve 1272 with another sleeve 1272 that is made from a different material. A rib 1249 extends circumferentially around first sleeve portion 1272A, proximate to the midpoint thereof, and projects radially outward relative to central axis $A_C$ to mate with sealing surface 250 in gate insert 220. Second sleeve portion 1272B extends from first sleeve portion 1272A and tapers towards central axis $A_C$ to surround tapered segment 1248. As shown, second sleeve portion 1272B covers a portion of tapered segment 1248. Second sleeve portion 1272B tapers angle which corresponds to that of the downstream end of opening 222 in gate insert 220 such that second sleeve portion 1272B is evenly spaced from opening 222. The downstream end of sleeve 1272B is shaped so as to create a seamless or relatively seamless transition between sleeve 1272 and an exposed portion or uncovered portion of tapered segment 1248 that surrounds an outlet 1230 of nozzle tip 1200 and is has a smaller surface area that the portion of tapered segment 1248 that is covered by second sleeve portion 1272B Downstream from rib 1249, sleeve 1272 and the exposed portion of tapered segment tapered segment 1248 surrounding outlet 1230 are spaced apart from and opening 222 to create a gap, or a so-called gate bubble B therebetween. An inside boundary of gate bubble B is defined the portion of sleeve 1272 that is downstream from rib 1249 and by the external surface the exposed portion of tapered segment tapered segment 1248 surrounding outlet 1230. An outside boundary of gate bubble B is defined by the portion of opening 222 in gate insert 220 that is downstream from where rib 349 contacts sealing surface 250. In operation, gate bubble B fills with molding material that becomes trapped between gate insert 220 on one side, and sleeve 1272 and the exposed portion of tapered segment 1248 on the other side. The trapped molding material creates a thermal barrier between tip 1200 and gate insert 220. In the current embodiment, rib 1249 is located proximate to the mid-point of the length of first sleeve portion 1272A such that upstream from rib 349, sleeve 372 is also spaced apart from gate insert 220.

Sleeve 1272 contacts outer tip component 1228 at a first contact area, shown at location 1274, and at a second contact area, shown at location 1275, which is spaced apart from first contact area 1274. In the current embodiment first contact area, shown at location 1274, is between an inner circumferential surface of the downstream end of second sleeve portion 1272B and an outer circumferential surface adjacent to the exposed portion of tapered segment 1248. In the current embodiment, the distance between first contact area, shown at location 1274 and rib 1349 is greater than the distance between rib 1249 and either of second contact area, shown at location 1275, and threaded engagement area, shown at 1276, which further limits the amount of heat loss from outer tip component 1228 and sealing surface 250. Also in the current embodiment, first contact area at location 1274 tapers in the downstream direction towards central axis $A_C$. This taper creates a sealing force between the respective contact surfaces of outer tip component 1228 and second sleeve portion 1272B as sleeve is progressively threaded onto outer tip component 1228. Second contact area shown at location 1275 is between an upstream facing end of first sleeve portion 1272A and a downstream facing portion of outer tip component 1228, which, as shown in FIG. 12, is adjacent to the downstream side of tool engagable feature 1236.

With the exception of a threaded connection between sleeve 1272 and outer tip component 1228, shown at 1276, a void 1273 extends around outer tip component 1228 between first and second contact areas, shown at locations 1274 and 1275, between sleeve 1272 and outer tip component 1228. In the current embodiment, void 1273 includes a first void portion 1273A between tapered segment 1248 and second sleeve portion 1272B, and includes a second void portion 1273B between cylindrical segment 1246 and first sleeve portion 1272A. In comparison to the previous embodiments, sleeve 1272 and void 1273, extend around the downstream end of outer tip component 1228 thereby increasing the length of the void which reduces the amount of thermal energy that is transferred from nozzle 110 to gate insert 220 by way of outer tip component 1228 and sleeve 1272.

Sleeve 1272 is made from a material that is less thermally conductive than the material selected for outer tip component 1228 so as to reduce heat transfer between outer tip component 1228 and gate insert 220. A non-limiting of a suitable material for outer tip component includes, for example, titanium.

Tip member 1202 includes an inlet passageway 1237 at an upstream end thereof that is sized to interface with nozzle channel 114. A plurality of connecting channels 1241 extend between the downstream end of inlet passageway 1237 and a circumferential outer surface of third section 1213 that is adjacent to second shoulder 1219. As shown, tip member 1202 includes six connecting channels 1241 (three of which are visible in the cross-sectional view of FIG. 12) that are perpendicular to central axis $A_C$.

Continuing with tip member 1202, third section 1213 is received within outer tip component 1228 so as to form a tubular passageway 1243 therebetween. Specifically, the outer circumferential surface of third section 1213 and bore 1239 respectively define the inside and outside boundaries of a portion of tubular passageway 1243 that has a relatively constant cross-sectional area, and the outside surface of cone shaped portion 1229 and a contracting portion 1269 of bore 1239 respectively define the inside and outside boundaries of a portion of tubular passageway 1243 which has a cross-sectional area that diminishes towards mold gate 125.

As shown in FIG. 12 gate insert 220 includes a gate member 220A and a locating member 220B that are sized to be received in a cavity insert, for example cavity insert 107 shown in FIG. 1. Gate member 220A defines mold gate 125 and a portion of a mold cavity surrounding mold gate. A groove or rabbet 1247 extends circumferentially around gate member near the downstream end thereof, which in conjunction with a cavity insert defines a gate insert cooling channel 1223 that encircles gate bubble B. Opening 222 extends through locating member 220B and into gate member 220A. The portion of opening 222 that defines the outer boundary of gate bubble B is mostly formed in gate member 220A, whereas remainder of the outer boundary of gate bubble B is formed in locating member 220B, which also forms sealing surface 250. Gate member 220A and locating member 220B can be made from different materials. For example gate member 220A can be made from a material that is more thermally conductive that locating member 220B.

In the previously described embodiments, the tip assemblies described herein include inner and outer tip components that are separable. However, it should be understood that tip assemblies can also include those having inner and outer tip components that are permanently joined together by, for example, vacuum brazing, and can also include monolithic a nozzle tip or monolithic tip body that has the same geometry as the assembled inner and outer tip components. Such a monolithic nozzle tip could be made a unitary component, by, for example, an additive manufacturing process, such as laser sintering. In the previously described embodiments, it should be understood that the specific materials described for the different parts or components is made by way of example and not limitation.

While various embodiments have been described above, it should be understood that they have been presented only as illustrations and examples of the present invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, can be used in combination with the features of any other embodiment.

What is claimed is:

1. A hot runner nozzle tip for delivering a melt stream of moldable material to a mold cavity, the hot runner nozzle tip comprising:
  an inner tip component including
    a base having a channel bore extending therethrough,
    a torpedo having a first tapered portion with a conical-shaped outer surface that radially expands in a downstream direction, a second tapered portion with a conical-shaped outer surface that radially contracts in the downstream direction and an inner extension portion extending between the first and second tapered portions,
    wherein the first tapered portion of the torpedo is surrounded by an expanding portion of the channel bore having a conical-shaped inner surface that radially expands in the downstream direction so as to define a first annular channel segment between the conical-shaped outer surface of the first tapered portion of the torpedo and the conical-shaped inner surface of the expanding portion of the channel bore; and
  an outer tip component including
    an attachment portion for connecting the nozzle tip to a hot runner nozzle,
  an outer extension portion projecting from the attachment portion, and
    a bore extending through the attachment portion and the outer extension portion,
  wherein the inner tip component is received in the outer tip component so as to define a second annular channel segment extending in the downstream direction from the first annular channel segment, the second annular channel segment being defined between the inner extension portion of the torpedo and the bore extending through the outer tip component,
  wherein a third annular channel segment is defined between the conical-shaped outer surface of the second tapered portion of the torpedo and an internal tapered surface of a contracting portion of the bore of the outer tip component, the third annular channel segment having a cross-sectional area that decreases in size towards a tip outlet, and
  wherein at least a portion of the first annular channel segment is apportioned into one or more arcuate channel segments by a respective one or more connectors extending between the conical-shaped outer surface of the first tapered portion of the torpedo and the conical-shaped inner surface of the expanding portion of the channel bore, and a cross-sectional area of each of the one or more arcuate channel segments increases in the downstream direction.

2. The hot runner nozzle tip according to claim 1, wherein the channel bore of the base defines a cylindrical shaped channel portion that extends between a tip inlet and the first annular channel segment.

3. The hot runner nozzle tip according to claim 1, wherein the size of a gap between an inside channel wall of the third annular channel segment, formed by the conical-shaped outer surface of the second tapered portion of the torpedo, and an outside channel wall of the third annular channel segment, formed by the internal tapered surface of the contracting portion of the bore of the outer tip component, diminishes in the downstream direction.

4. The hot runner nozzle tip according to claim 1, wherein the size of a gap between an inside channel wall of the first annular channel segment, formed by the conical-shaped outer surface of the first tapered portion of the torpedo, and an outside channel wall of the first annular channel segment, formed by the conical-shaped inner surface of the expanding portion of the channel bore, is constant along a length of the first annular channel segment.

5. The hot runner nozzle tip according to claim 1, wherein the size of a gap between an inside channel wall of the first annular channel segment, formed by the conical-shaped outer surface of the first tapered portion of the torpedo, and an outside channel wall of the first annular channel segment, formed by the conical-shaped inner surface of the expanding portion of the channel bore, diminishes in the downstream direction.

6. The hot runner nozzle tip according to claim 1, wherein the cross-sectional area of the second annular channel segment is constant between the first annular channel segment and the third annular channel segment.

7. The hot runner nozzle tip according to claim 1, wherein the one or more arcuate channel segments is three arcuate channel segments.

8. The hot runner nozzle tip according to claim 1, wherein the one or more arcuate channel segments is four arcuate channel segments.

* * * * *